(12) United States Patent
Laroche et al.

(10) Patent No.: US 12,170,793 B2
(45) Date of Patent: Dec. 17, 2024

(54) HIGH LEVEL SYNTAX FOR VIDEO CODING AND DECODING

(71) Applicant: CANON KABUSHIKI KAISHA, Tokyo (JP)

(72) Inventors: Guillaume Laroche, Saint Aubin d'Aubigné (FR); Naël Ouedraogo, Val d'Anast (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/913,030

(22) PCT Filed: Mar. 17, 2021

(86) PCT No.: PCT/EP2021/056866
§ 371 (c)(1),
(2) Date: Sep. 20, 2022

(87) PCT Pub. No.: WO2021/185927
PCT Pub. Date: Sep. 23, 2021

(65) Prior Publication Data
US 2023/0179802 A1  Jun. 8, 2023

(30) Foreign Application Priority Data
Mar. 20, 2020  (GB) .................................... 2004093

(51) Int. Cl.
*H04N 19/70* (2014.01)
*H04N 19/174* (2014.01)
(52) U.S. Cl.
CPC ........... *H04N 19/70* (2014.11); *H04N 19/174* (2014.11)

(58) Field of Classification Search
None
See application file for complete search history.

(56) References Cited

U.S. PATENT DOCUMENTS

2022/0132151 A1\*  4/2022  Deshpande .......... H04N 19/174
2022/0182620 A1\*  6/2022  Paluri ................. H04N 19/176

FOREIGN PATENT DOCUMENTS

| CN | 104054347 A | 9/2014 | |
| EP | 4093030 A1 | 11/2022 | |
| WO | WO-2021145687 A1 \* | 7/2021 | ........... H04N 19/119 |

OTHER PUBLICATIONS

Hendry, "AHG9/AHG12: A summary of HLS contributions on tiles and slices," JVET-Q0586-v2, 17th Meeting: Brussels, BE, Jan. 2020.\*
Bross et al., "Versatile Video Coding (Draft 8)," JVET-Q2001-vE, 17th Meeting: Brussels, BE, Jan. 2020.\*
Chen et al., "AHG17/AHG12: On associating slices with a subpicture," JVET-P0144-v1, 16th Meeting: Geneva, CH, Oct. 2019.\*

(Continued)

*Primary Examiner* — Michael J Hess
(74) *Attorney, Agent, or Firm* — Canon U.S.A., Inc. IP Division

(57) ABSTRACT

There is described a method of decoding video data from a bitstream. The bitstream comprising video data corresponding to one or more slices. The decoding comprises parsing the syntax elements, and not permitting use of a subpicture and/or parsing of subpicture information in combination with at least one syntax element that indicates that a picture to be decoded contains only one slice. The bitstream is decoded using said syntax elements.

17 Claims, 14 Drawing Sheets

(56) References Cited

OTHER PUBLICATIONS

Samuelsson et al., "AHG9: Picture Header in Slice Header," JVET-Q0775, 17th Meeting: Brussels, BE, Jan. 2020.*

Ye-Kui Wang, AHG9: A few more general constraints flags, Joint Video Experts Team (JVET) of ITU-T SG 16 WP 3 and ISO/IEC JTC 1/SC 29/WG 11, 17th Meeting: Brussels, BE, Jan. 7-17, 2020, Doc. No. JVET-Q0114-v1.

Benjamin Bross, et al., Versatile Video Coding (Draft 8), Joint Video Experts Team (JVET) of ITU-T SG 16 WP 3 and ISO/IEC JTC 1/SC 29/WG11, 17th Meeting, Brussels, BE, Jan. 7-17, 2020, Doc. No. JVET-Q2001-vE.

Jonatan Samuelsson, et al., AHG9: Picture Header in Slice Header, Joint Video Experts Team (JVET) of ITU-T SG 16 WP 3 and ISO/IEC JTC 1/SC 29/WG11, 17th Meeting, Brussels, BE, Jan. 7-17, 2020, Doc. No. JVET- Q0775.

* cited by examiner

HIGH LEVEL SYNTAX FOR VIDEO CODING AND DECODING

CROSS REFERENCE TO RELATED APPLICATION

This application is the National Phase application of PCT Application No. PCT/EP2021/056866, filed on Mar. 17, 2021. This application claims the benefit under 35 U.S.C. § 119 (a)-(d) of United Kingdom Patent Application No. 2004093.7, filed on Mar. 20, 2020. The above cited patent applications are incorporated herein by reference in their entirety.

FIELD OF INVENTION

The present invention relates to video coding and decoding, and in particular to the high level syntax used in the bitstream.

BACKGROUND

Recently, the Joint Video Experts Team (JVET), a collaborative team formed by MPEG and ITU-T Study Group 16's VCEG, commenced work on a new video coding standard referred to as Versatile Video Coding (VVC). The goal of VVC is to provide significant improvements in compression performance over the existing HEVC standard (i.e., typically twice as much as before) and to be completed in 2020. The main target applications and services include—but not limited to—360-degree and high-dynamic-range (HDR) videos. In total, JVET evaluated responses from 32 organizations using formal subjective tests conducted by independent test labs. Some proposals demonstrated compression efficiency gains of typically 40% or more when compared to using HEVC. Particular effectiveness was shown on ultra-high definition (UHD) video test material. Thus, we may expect compression efficiency gains well-beyond the targeted 50% for the final standard.

The JVET exploration model (JEM) uses all the HEVC tools and has introduced a number of new tools. These changes have necessitated a change to the structure of the bitstream, and in particular to the high-level syntax which can have a impact on the overall bitrate of the bitstream.

SUMMARY

The present invention relates to an improvement to the high level syntax structure, which leads to a reduction in complexity and/or signalling without any significant degradation in coding performance.

In a first aspect according to the invention there is provided a method of decoding video data from a bitstream, the bitstream comprising video data corresponding to one or more slices, the decoding comprising: parsing one or more syntax elements, and not permitting use of a subpicture and/or parsing of subpicture information when at least one syntax element indicates that a picture to be decoded contains one slice; and decoding said bitstream using said syntax elements.

In a further aspect according to the invention there is provided a method of decoding video data from a bitstream, the bitstream comprising video data corresponding to one or more slices, the decoding comprising: parsing one or more syntax elements, and not permitting use of a subpicture and/or parsing of subpicture information in combination with at least one syntax element that indicates that a picture to be decoded contains only one slice; and decoding said bitstream using said syntax elements.

In a yet further aspect according to the invention there is provided a method of decoding video data from a bitstream, the bitstream comprising video data corresponding to one or more slices, said bitstream being constrained so that in a case where the bitstream includes a syntax element having a value indicating that a picture to be decoded contains only one slice, the bitstream also includes a syntax element having a value indicating that no subpicture is used and/or that no subpicture information is present for the picture, the method comprising decoding said bitstream using said syntax elements.

This avoids inconsistency in bitstreams. Specifically, a picture which contains subpictures has several slices. If the picture contains only one slice it is a picture which contains only one subpicture. Further, this simplifies the parsing of the slice header for some implementations.

The method may further comprise restricting the value of a syntax element indicating the presence of a subpicture to a value indicating that no subpicture is used when at least one syntax element indicates that a picture to be decoded contains one slice. The syntax element indicating the presence of a subpicture may comprise a flag indicating whether subpicture information is present.

The syntax element indicating that the picture to be decoded contains one slice may comprise a picture header in slice header syntax element, wherein the picture header being signalled in the slice header is indicative of the picture containing one slice.

The at least one syntax element indicating that picture to be decoded includes one slice may include a syntax element indicating that a raster scan slice mode is enabled, may include a syntax element indicating a number of tiles in a picture that is greater than one, and may include a syntax element indicating number of tiles in the slice that is equal to the number of tiles in the picture.

In a second aspect according to the invention, there is provided a method of decoding video data from a bitstream, the bitstream comprising video data corresponding to one or more slices, the decoding comprising: parsing one or more syntax elements, and not permitting use of a subpicture and/or parsing of subpicture information when the picture header is signalled in the slice header; and decoding said bitstream using said syntax elements.

In a third aspect according to the invention, there is provided a method of decoding video data from a bitstream, the bitstream comprising video data corresponding to one or more slices, the decoding comprising: parsing one or more syntax elements, and not permitting the colour planes of a colour picture to be separated when the picture contains only one slice; and decoding said bitstream using said syntax elements.

An advantage of this aspect is that it avoids inconsistence bitstreams. Indeed, a picture which contains the colour plane coded independently has several slices. Accordingly, it is not possible to have only one slice in the current picture. Moreover, it simplifies the parsing of the slice header for some implementations.

The not permitting may comprise enforcing a constraint that a flag indicating whether colour planes of a picture are to be separated has a value indicating that the planes are not separated.

Optionally, the method further comprises parsing a syntax element indicating whether a picture header is signalled in a slice header, wherein the picture header being signalled in the slice header is indicative of the picture containing one slice.

Optionally, the method further comprises permitting parsing a colour plane identifier syntax element when the colour planes of the colour picture are separated and the picture header is located in the slice header.

Optionally, the method further comprises not permitting the colour planes of the current picture to be separated if a raster-scan slice mode is enabled, a number of tiles in the picture is greater than one and when a number of tiles in the slice is equal to the number of tiles in the picture.

Optionally, the method further comprises not permitting the colour planes of the picture to be separated by restricting the value of a flag indicating the separation of the colour planes of the picture to a value that indicates no separation of the colour planes.

Optionally, a colour plane identifier syntax element is not decoded if a raster-scan slice mode is enabled, a number of tiles in the picture is greater than one and when a number of tiles in the slice is equal to the number of tiles in the picture.

In a fourth aspect according to the invention, there is provided a method of decoding video data from a bitstream, the bitstream comprising video data corresponding to one or more slices, the decoding comprising: parsing one or more syntax elements, and not permitting the colour planes of a colour picture to be separated when the picture header is signalled in the slice header; and decoding said bitstream using said syntax elements.

In a fifth aspect according to the invention, there is provided a method of decoding video data from a bitstream comprising performing the method according to the first or second aspects and the method according to the third or fourth aspects. In a sixth aspect according to the invention, there is provided a method of decoding video data from a bitstream, the bitstream comprising video data corresponding to one or more slices of a picture, the decoding comprising: parsing one or more syntax elements, and enforcing the colour planes of a colour picture to be separated and inferring a single colour plane identity for the one or more slices in the picture; and decoding said bitstream using said syntax elements.

This offers the possibility to extract easily only one colour plane from a bitstream containing the 3 colour planes without modification of some syntax elements to each slice. So, it saves complexity for such applications.

Optionally, the enforcement is made in a case where the picture contains only one slice.

The colour plane identity inferred may be Luma.

Optionally, the enforcement is made when a picture header is signalled in the slice header.

Optionally, the enforcement is made when the raster-scan slice mode is enabled, the number of tiles in the current picture is superior to 1 and when the number of tiles in the slice is equal to the number of tiles in the current picture.

In a seventh aspect according to the invention there is provided a method of encoding video data into a bitstream, the bitstream comprising video data corresponding to one or more slices, the encoding comprising: determining one or more syntax elements, and not permitting use of a subpicture and/or encoding of subpicture information when at least one syntax element indicates that a picture to be encoded contains one slice; and encoding said bitstream using said syntax elements. In an additional aspect according to the invention there is provided a method of encoding video data into a bitstream, the bitstream comprising video data corresponding to one or more slices, the encoding comprising: determining one or more syntax elements, and not permitting use of a subpicture and/or encoding of subpicture information in combination with at least one syntax element that indicates that a picture to be encoded contains only one slice; and encoding said bitstream using said syntax elements. In a further additional aspect according to the invention there is provided a method of encoding video data into a bitstream, the bitstream comprising video data corresponding to one or more slices, said bitstream being constrained so that in a case where the bitstream includes a syntax element having a value indicating that a picture to be decoded contains only one slice, the bitstream also includes a syntax element having a value indicating that no subpicture is used and/or that no subpicture information is present for the picture, the method comprising encoding said bitstream using said syntax elements. This avoids inconsistency in bitstreams. Specifically, a picture which contains subpictures has several slices. If the picture contains only one slice it is a picture which contains only one subpicture. Further, this simplifies the parsing of the slice header for some implementations.

Optionally, the method further comprises restricting the value of a syntax element indicating the presence of a subpicture to a value indicating that no subpicture is used when at least one syntax element indicates that a picture to be decoded contains one slice.

The syntax element indicating the presence of a subpicture may comprise a flag indicating whether subpicture information is present.

The syntax element indicating that the picture to be encoded contains one slice may comprise a picture header in slice header syntax element, wherein the picture header being signalled in the slice header is indicative of the picture containing one slice.

The at least one syntax element indicating that picture to be encoded includes one slice may include a syntax element indicating that a raster scan slice mode is enabled, may include a syntax element indicating a number of tiles in a picture that is greater than one, and may include a syntax element indicating number of tiles in the slice that is equal to the number of tiles in the picture.

In another aspect of the invention there is provided a method of decoding video data from a bitstream, the bitstream comprising video data corresponding to one or more slices, the decoding comprising: parsing one or more syntax elements, and not permitting use of a subpicture and/or parsing of subpicture information and a picture header to be transmitted in a slice header; and decoding said bitstream using said syntax elements.

Optionally, the use of subpicture and/or parsing of subpicture information and whether a picture header is to be transmitted in a slice header are indicated by syntax elements to be parsed.

Optionally, a syntax element indicating use of subpicture and/or parsing of subpicture information and a syntax element indicating a picture header is to be transmitted in a slice header are not permitted in combination.

In an eighth aspect according to the invention, there is provided a method of encoding video data into a bitstream, the bitstream comprising video data corresponding to one or more slices, the encoding comprising: determining one or more syntax elements, and not permitting use of a subpicture and/or encoding of subpicture information when the picture header is signalled in the slice header; and encoding said video data using said syntax elements.

In another further aspect of the invention there is provided a method of encoding video data into a bitstream, the bitstream comprising video data corresponding to one or more slices, the decoding comprising: parsing one or more syntax elements, and not permitting use of a subpicture and/or parsing of subpicture information and a picture header to be transmitted in a slice header; and encoding said bitstream using said syntax elements.

Optionally, the use of subpicture and/or parsing of subpicture information and whether a picture header is to be transmitted in a slice header are indicated by syntax elements to be parsed.

Optionally, a syntax element indicating use of subpicture and/or parsing of subpicture information and a syntax element indicating a picture header is to be transmitted in a slice header are not permitted in combination.

In a ninth aspect according to the invention there is provided a method of encoding video data into a bitstream, the bitstream comprising video data corresponding to one or more slices, the encoding comprising: determining one or more syntax elements, and not permitting the colour planes of a colour picture to be separated when the picture contains only one slice; and encoding said bitstream using said syntax elements. An advantage of this aspect is that it avoids inconsistence bitstreams. Indeed, a picture which contains the colour plane coded independently has several slices. Accordingly, it is not possible to have only one slice in the current picture. Moreover, it simplifies the parsing of the slice header for some implementations.

The not permitting may comprise enforcing a constraint that a flag indicating whether colour planes of a picture are to be separated has a value indicating that the planes are not separated.

The method may further comprise determining a syntax element indicating whether a picture header is signalled is a slice header, wherein the picture header being signalled in the slice header is indicative of the picture containing one slice.

The method may further comprise permitting determining a colour plane identifier syntax element when the colour planes of the colour picture are separated and the picture header is located in the slice header.

The method may further comprise not permitting the colour planes of the current picture to be separated if a raster-scan slice mode is enabled, a number of tiles in the picture is greater than one and when a number of tiles in the slice is equal to the number of tiles in the picture.

Optionally, the not permitting the colour planes of the picture to be separated is by restricting the value of a flag indicating the separation of the colour planes of the picture to a value that indicates no separation of the colour planes.

Optionally, a colour plane identifier syntax element is not encoded if a raster-scan slice mode is enabled, a number of tiles in the picture is greater than one and when a number of tiles in the slice is equal to the number of tiles in the picture.

In a tenth aspect according to the invention, there is provided a method of encoding video data into a bitstream, the bitstream comprising video data corresponding to one or more slices, the encoding comprising: determining one or more syntax elements, and not permitting the colour planes of a colour picture to be separated when the picture header is to be signalled in the slice header; and encoding said video data using said syntax elements.

In an eleventh aspect according to the invention there is provided a method of encoding video data into a bitstream comprising performing the method according to the seventh or eighth aspects and the method of the ninth or tenth aspects.

In a twelfth aspect according to the invention, there is provided a method of encoding video data into a bitstream, the bitstream comprising video data corresponding to one or more slices of a picture, the encoding comprising: determining one or more syntax elements, and enforcing the colour planes of a colour picture to be separated and setting a single colour plane identity for the one or more slices in the picture; and encoding said bitstream using said syntax elements. In an embodiment, the colour plane identity may be inferred.

This offers the possibility to extract easily only one colour plane from a bitstream containing the 3 colour planes without modification of some syntax elements to each slice. So, it saves complexity for such applications.

Optionally, the enforcement is made in a case where the picture contains only one slice.

Optionally, the colour plane identity inferred is Luma.

Optionally, the enforcement is made when a picture header is signalled in the slice header.

Optionally, the enforcement is made when the raster-scan slice mode is enabled, the number of tiles in the current picture is superior to 1 and when the number of tiles in the slice is equal to the number of tiles in the current picture.

In a thirteenth aspect according to the invention, there is provided a device comprising a decoder configured to perform the method of any of the first to fourth aspects.

In a fourteenth aspect according to the invention there is provided a device comprising an encoder configured to perform the method of any of the fifth to eighth aspects.

In a fifteenth aspect according to the invention, there is provided a computer program which upon execution causes the method of any of the first to eighth aspects to be performed.

The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet. Further features of the invention are characterised by the independent and dependent claims Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

BRIEF DESCRIPTION OF THE DRAWINGS

Reference will now be made, by way of example, to the accompanying drawings, in which.

DETAILED DESCRIPTION

Figure 1:
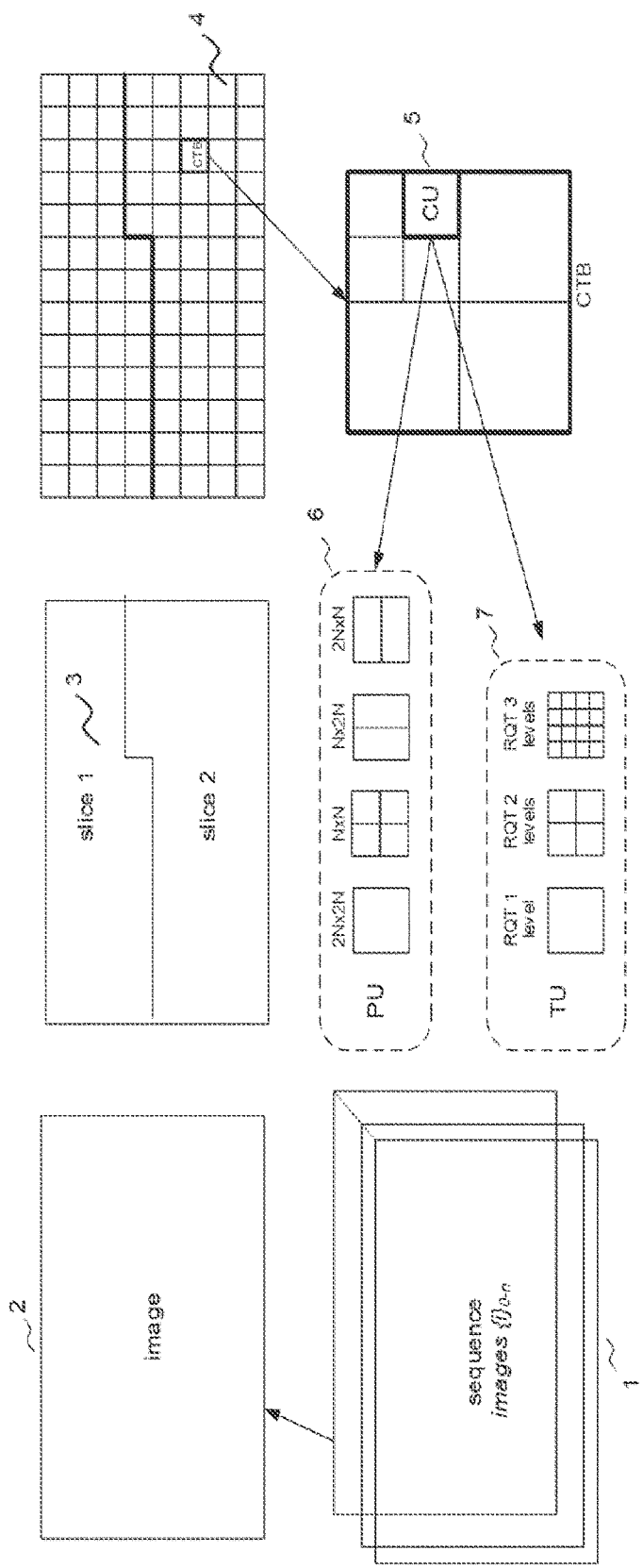
FIG. 1 is a diagram for use in explaining a coding structure used in HEVC and VVC.

FIG. 1 relates to a coding structure used in the High Efficiency Video Coding (HEVC) video standard. A video sequence 1 is made up of a succession of digital images i. Each such digital image is represented by one or more matrices. The matrix coefficients represent pixels.

An image 2 of the sequence may be divided into slices 3. A slice may in some instances constitute an entire image. These slices are divided into non-overlapping Coding Tree Units (CTUs). A Coding Tree Unit (CTU) is the basic processing unit of the High Efficiency Video Coding (HEVC) video standard and conceptually corresponds in structure to macroblock units that were used in several previous video standards. A CTU is also sometimes referred to as a Largest Coding Unit (LCU). A CTU has luma and chroma component parts, each of which component parts is called a Coding Tree Block (CTB). These different color components are not shown in FIG. 1.

A CTU is generally of size 64 pixels×64 pixels. Each CTU may in turn be iteratively divided into smaller variable-size Coding Units (CUs) 5 using a quadtree decomposition.

Coding units are the elementary coding elements and are constituted by two kinds of sub-unit called a Prediction Unit (PU) and a Transform Unit (TU). The maximum size of a PU or TU is equal to the CU size. A Prediction Unit corresponds to the partition of the CU for prediction of pixels values. Various different partitions of a CU into PUs are possible as shown by 606 including a partition into 4 square PUs and two different partitions into 2 rectangular PUs. A Transform Unit is an elementary unit that is subjected to spatial transformation using DCT. A CU can be partitioned into TUs based on a quadtree representation 607.

Each slice is embedded in one Network Abstraction Layer (NAL) unit. In addition, the coding parameters of the video sequence are stored in dedicated NAL units called parameter sets. In HEVC and H.264/AVC two kinds of parameter sets NAL units are employed: first, a Sequence Parameter Set (SPS) NAL unit that gathers all parameters that are unchanged during the whole video sequence. Typically, it handles the coding profile, the size of the video frames and other parameters. Secondly, a Picture Parameter Set (PPS) NAL unit includes parameters that may change from one image (or frame) to another of a sequence. HEVC also includes a Video Parameter Set (VPS) NAL unit which contains parameters describing the overall structure of the bitstream. The VPS is a new type of parameter set defined in HEVC, and applies to all of the layers of a bitstream. A layer may contain multiple temporal sub-layers, and all version 1 bitstreams are restricted to a single layer. HEVC has certain layered extensions for scalability and multiview and these will enable multiple layers, with a backwards compatible version 1 base layer.

In the current definition of the Versatile Video Coding (VVC), there is three high level possibilities for the partitioning of a picture: subpictures, slices and tiles. Each having their own characteristics and usefulness. The partitioning into subpictures is for the spatial extraction and/or merging of regions of a video. The partitioning into slices is based on a similar concept as the previous standards and corresponds to packetization for video transmission even if it can be used for other applications. The partitioning into Tiles is conceptually an encoder parallelisation tool as it splits the picture into independent coding regions of the same size (almost) of the picture. But this tool can be used also for other applications.

Figure 10:
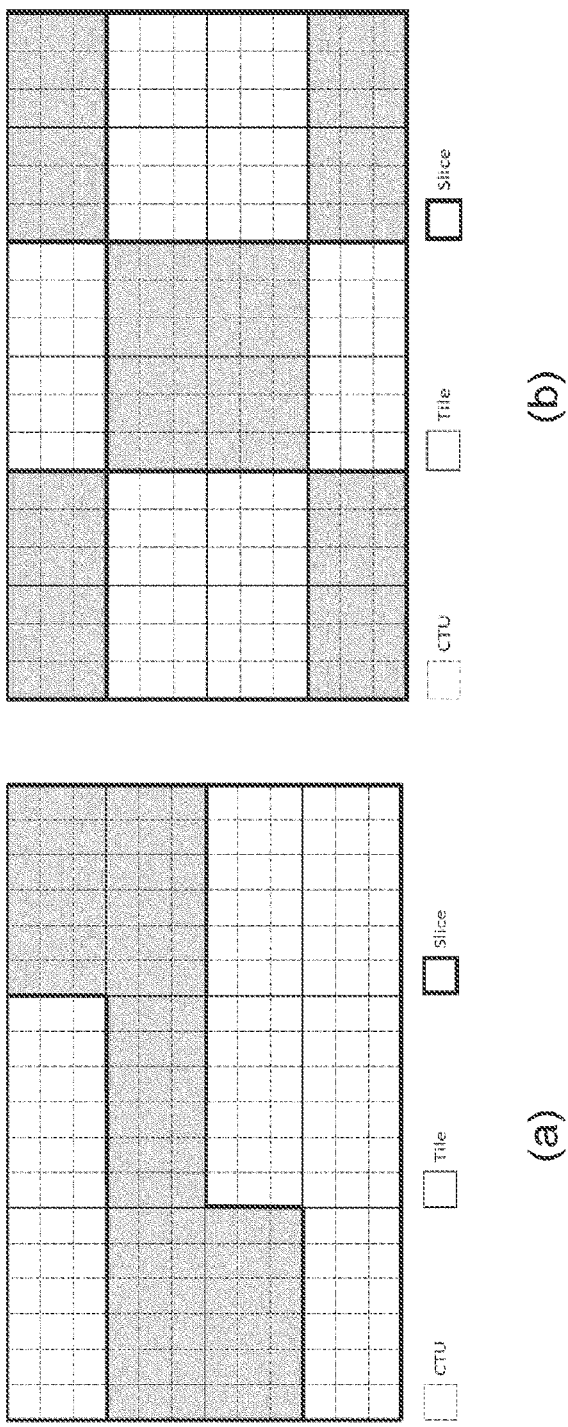
FIG. 10 is the illustration of the raster-scan slice mode and the rectangular slice mode of the current VVC draft standard.

As these three high level available possible ways of partitioning of a picture can be used together, there is several modes for their usage. As defined in the current draft specifications of VVC, two modes of slices are defined. For the raster-scan slice mode, a slice contains a sequence of complete tiles in a tile raster scan of the picture. This mode in the current VVC specification is illustrated in FIG. 10(a). As shown in this figure, the picture contains 18 by 12 luma CTUs is shown that is partitioned into 12 tiles and 3 raster-scan slices.

For the second one, the rectangular slice mode, a slice contains either a number of complete tiles that collectively from a rectangular region of the picture. This mode in the current VVC specification is illustrated in FIG. 10(b). In this example, a picture with 18 by 12 luma CTUs is shown that is partitioned into 24 tiles and 9 rectangular slices.

Figure 2:
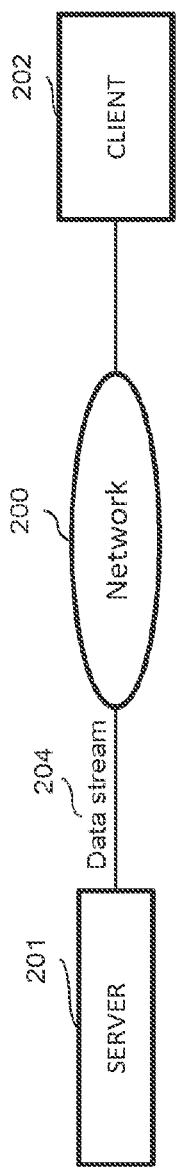
FIG. 2 is a block diagram schematically illustrating a data communication system in which one or more embodiments of the invention may be implemented.

FIG. 2 illustrates a data communication system in which one or more embodiments of the invention may be implemented. The data communication system comprises a transmission device, in this case a server 201, which is operable to transmit data packets of a data stream to a receiving device, in this case a client terminal 202, via a data communication network 200. The data communication network 200 may be a Wide Area Network (WAN) or a Local Area Network (LAN). Such a network may be for example a wireless network (Wifi/802.11 a or b or g), an Ethernet network, an Internet network or a mixed network composed of several different networks. In a particular embodiment of the invention the data communication system may be a digital television broadcast system in which the server 201 sends the same data content to multiple clients.

The data stream 204 provided by the server 201 may be composed of multimedia data representing video and audio data. Audio and video data streams may, in some embodiments of the invention, be captured by the server 201 using a microphone and a camera respectively. In some embodiments data streams may be stored on the server 201 or received by the server 201 from another data provider, or generated at the server 201. The server 201 is provided with an encoder for encoding video and audio streams in particular to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format or H.264/AVC format.

The client 202 receives the transmitted bitstream and decodes the reconstructed bitstream to reproduce video images on a display device and the audio data by a loud speaker.

Although a streaming scenario is considered in the example of FIG. 2, it will be appreciated that in some embodiments of the invention the data communication between an encoder and a decoder may be performed using for example a media storage device such as an optical disc.

In one or more embodiments of the invention a video image is transmitted with data representative of compensation offsets for application to reconstructed pixels of the image to provide filtered pixels in a final image.

Figure 3:
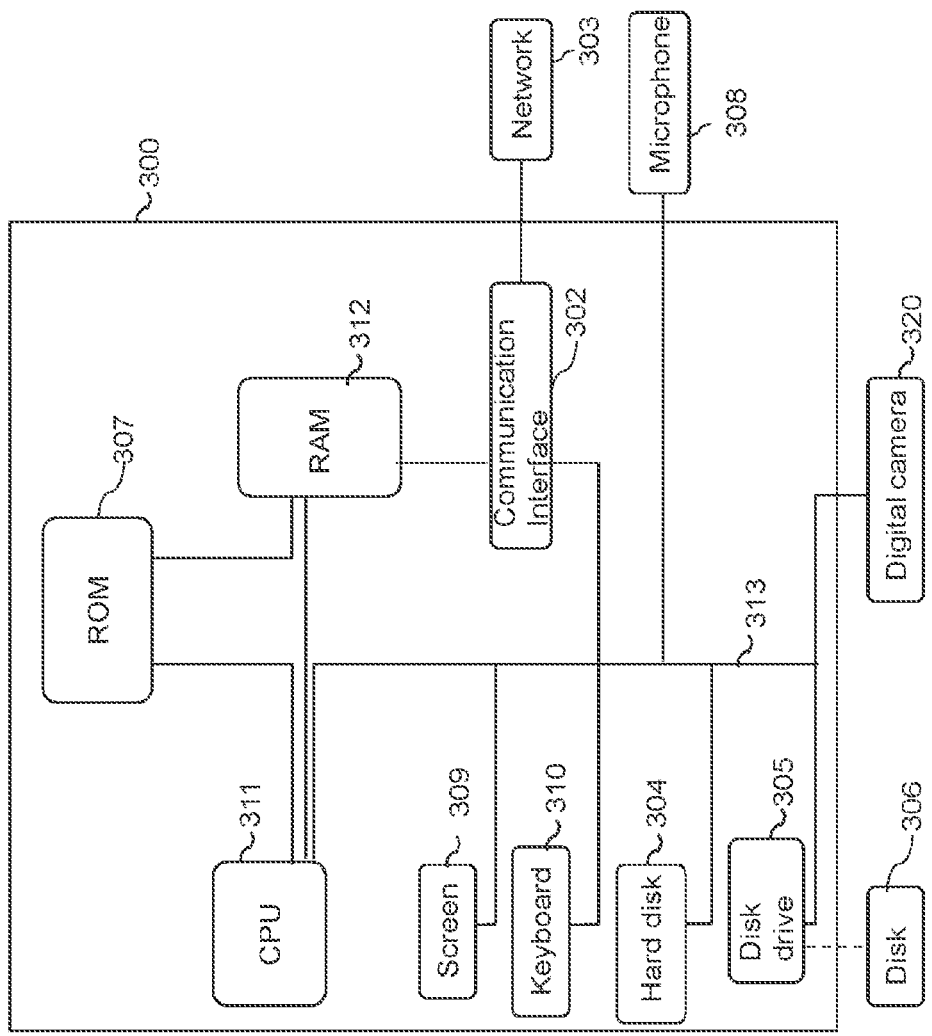
FIG. 3 is a block diagram illustrating components of a processing device in which one or more embodiments of the invention may be implemented.

FIG. 3 schematically illustrates a processing device 300 configured to implement at least one embodiment of the present invention. The processing device 300 may be a device such as a micro-computer, a workstation or a light portable device. The device 300 comprises a communication bus 313 connected to:

- a central processing unit 311, such as a microprocessor, denoted CPU;
- a read only memory 306, denoted ROM, for storing computer programs for implementing the invention;
- a random access memory 312, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and
- a communication interface 302 connected to a communication network 303 over which digital data to be processed are transmitted or received Optionally, the apparatus 300 may also include the following components:

- a data storage means 304 such as a hard disk, for storing computer programs for implementing methods of one or more embodiments of the invention and data used or produced during the implementation of one or more embodiments of the invention;
- a disk drive 305 for a disk 306, the disk drive being adapted to read data from the disk 306 or to write data onto said disk;
- a screen 309 for displaying data and/or serving as a graphical interface with the user, by means of a keyboard 310 or any other pointing means.

The apparatus 300 can be connected to various peripherals, such as for example a digital camera 320 or a microphone 308, each being connected to an input/output card (not shown) so as to supply multimedia data to the apparatus 300.

The communication bus provides communication and interoperability between the various elements included in the apparatus 300 or connected to it. The representation of the bus is not limiting and in particular the central processing unit is operable to communicate instructions to any element of the apparatus 300 directly or by means of another element of the apparatus 300.

The disk 306 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 306, on the hard disk 304 or on a removable digital medium such as for example a disk 306 as described previously. According to a variant, the executable code of the programs can be received by means of the communication network 303, via the interface 302, in order to be stored in one of the storage means of the apparatus 300 before being executed, such as the hard disk 304.

The central processing unit 311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 304 or in the read only memory 306, are transferred into the random access memory 312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 4:
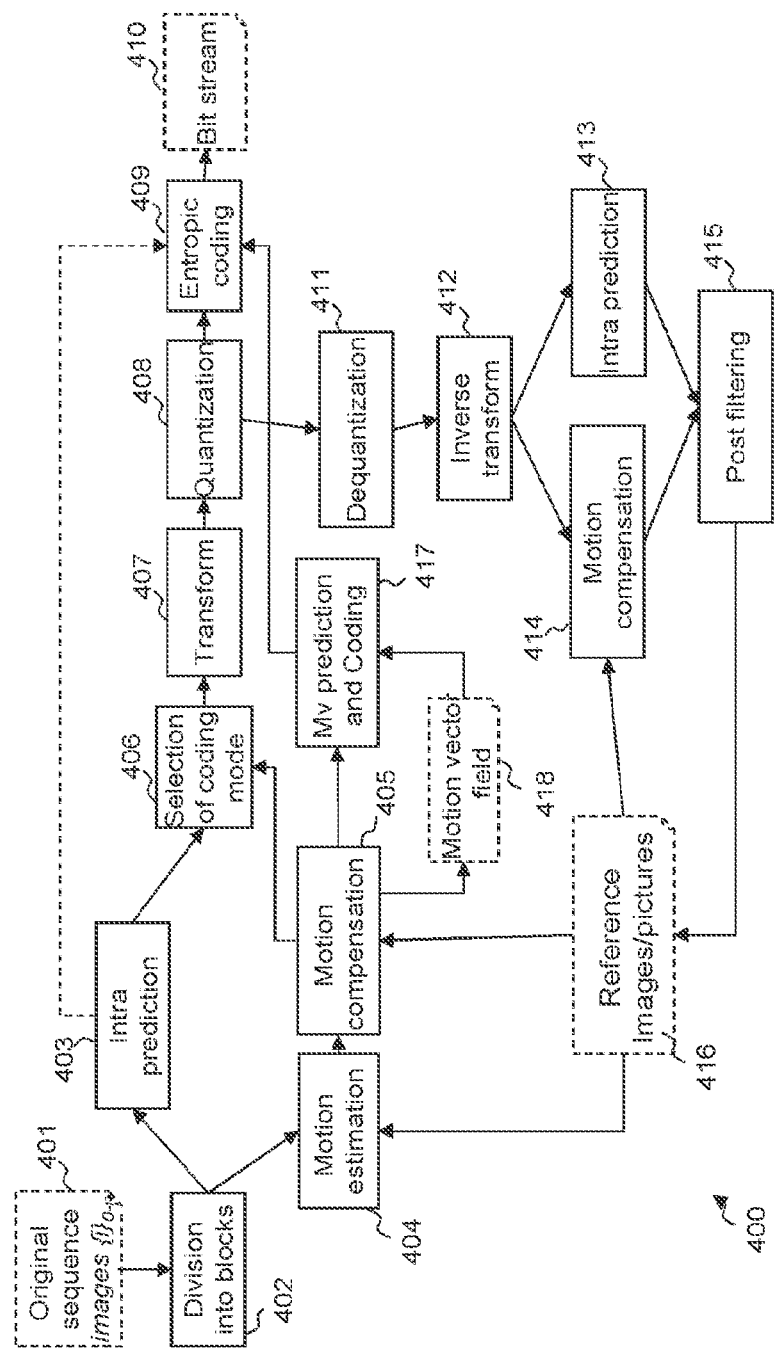
FIG. 4 is a flow chart illustrating steps of an encoding method according to embodiments of the invention.

FIG. 4 illustrates a block diagram of an encoder according to at least one embodiment of the invention. The encoder is represented by connected modules, each module being adapted to implement, for example in the form of programming instructions to be executed by the CPU 311 of device 300, at least one corresponding step of a method implementing at least one embodiment of encoding an image of a sequence of images according to one or more embodiments of the invention.

An original sequence of digital images i0 to in 401 is received as an input by the encoder 400. Each digital image is represented by a set of samples, known as pixels.

A bitstream 410 is output by the encoder 400 after implementation of the encoding process. The bitstream 410 comprises a plurality of encoding units or slices, each slice comprising a slice header for transmitting encoding values of encoding parameters used to encode the slice and a slice body, comprising encoded video data.

The input digital images i0 to in 401 are divided into blocks of pixels by module 402. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 403 implements an Intra prediction process, in which the given block to be encoded is predicted by a predictor computed from pixels of the neighbourhood of said block to be encoded. An indication of the selected Intra predictor and the difference between the given block and its predictor is encoded to provide a residual if the Intra coding is selected.

Temporal prediction is implemented by motion estimation module 404 and motion compensation module 405. Firstly, a reference image from among a set of reference images 416 is selected, and a portion of the reference image, also called reference area or image portion, which is the closest area to the given block to be encoded, is selected by the motion estimation module 404. Motion compensation module 405 then predicts the block to be encoded using the selected area. The difference between the selected reference area and the given block, also called a residual block, is computed by the motion compensation module 405. The selected reference area is indicated by a motion vector.

Thus, in both cases (spatial and temporal prediction), a residual is computed by subtracting the prediction from the original block.

In the INTRA prediction implemented by module 403, a prediction direction is encoded. In the temporal prediction, at least one motion vector is encoded. In the Inter prediction implemented by modules 404, 405, 416, 418, 417, at least one motion vector or data for identifying such motion vector is encoded for the temporal prediction.

Information relative to the motion vector and the residual block is encoded if the Inter prediction is selected. To further reduce the bitrate, assuming that motion is homogeneous, the motion vector is encoded by difference with respect to a motion vector predictor. Motion vector predictors of a set of motion information predictors is obtained from the motion vectors field 418 by a motion vector prediction and coding module 417.

The encoder 400 further comprises a selection module 406 for selection of the coding mode by applying an encoding cost criterion, such as a rate-distortion criterion. In order to further reduce redundancies a transform (such as DCT) is applied by transform module 407 to the residual block, the transformed data obtained is then quantized by quantization module 408 and entropy encoded by entropy encoding module 409. Finally, the encoded residual block of the current block being encoded is inserted into the bitstream 410.

The encoder 400 also performs decoding of the encoded image in order to produce a reference image for the motion estimation of the subsequent images. This enables the encoder and the decoder receiving the bitstream to have the same reference frames. The inverse quantization module 411 performs inverse quantization of the quantized data, followed by an inverse transform by reverse transform module 412. The reverse intra prediction module 413 uses the prediction information to determine which predictor to use for a given block and the reverse motion compensation module 414 actually adds the residual obtained by module 412 to the reference area obtained from the set of reference images 416.

Figure 5:
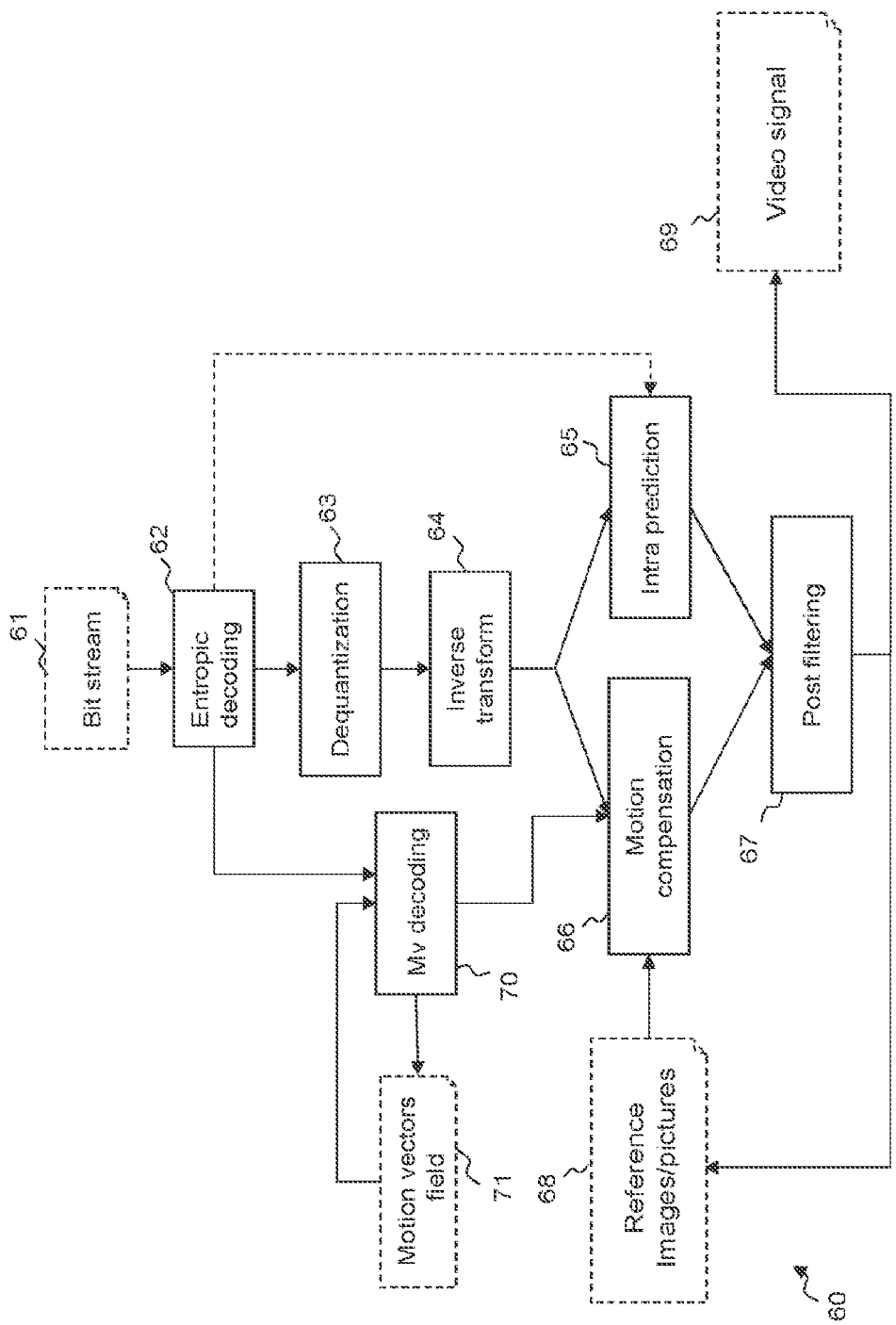
FIG. 5 is a flow chart illustrating steps of a decoding method according to embodiments of the invention.

Post filtering is then applied by module 415 to filter the reconstructed frame of pixels. In the embodiments of the invention an SAO loop filter is used in which compensation offsets are added to the pixel values of the reconstructed pixels of the reconstructed image FIG. 5 illustrates a block diagram of a decoder 60 which may be used to receive data from an encoder according an embodiment of the invention. The decoder is represented by connected modules, each module being adapted to implement, for example in the form of programming instructions to be executed by the CPU 311 of device 300, a corresponding step of a method implemented by the decoder 60.

The decoder 60 receives a bitstream 61 comprising encoding units, each one being composed of a header containing information on encoding parameters and a body containing the encoded video data. The structure of the bitstream in VVC is described in more detail below with reference to FIG. 6. As explained with respect to FIG. 4, the encoded video data is entropy encoded, and the motion vector predictors' indexes are encoded, for a given block, on a predetermined number of bits. The received encoded video data is entropy decoded by module 62. The residual data are then dequantized by module 63 and then a reverse transform is applied by module 64 to obtain pixel values.

The mode data indicating the coding mode are also entropy decoded and based on the mode, an INTRA type decoding or an INTER type decoding is performed on the encoded blocks of image data.

In the case of INTRA mode, an INTRA predictor is determined by intra reverse prediction module 65 based on the intra prediction mode specified in the bitstream.

If the mode is INTER, the motion prediction information is extracted from the bitstream so as to find the reference area used by the encoder. The motion prediction information is composed of the reference frame index and the motion vector residual. The motion vector predictor is added to the motion vector residual in order to obtain the motion vector by motion vector decoding module 70.

Motion vector decoding module 70 applies motion vector decoding for each current block encoded by motion prediction. Once an index of the motion vector predictor, for the current block has been obtained the actual value of the motion vector associated with the current block can be decoded and used to apply reverse motion compensation by module 66. The reference image portion indicated by the decoded motion vector is extracted from a reference image 68 to apply the reverse motion compensation 66. The motion vector field data 71 is updated with the decoded motion vector in order to be used for the inverse prediction of subsequent decoded motion vectors.

Finally, a decoded block is obtained. Post filtering is applied by post filtering module 67. A decoded video signal 69 is finally provided by the decoder 60.

Figure 6:
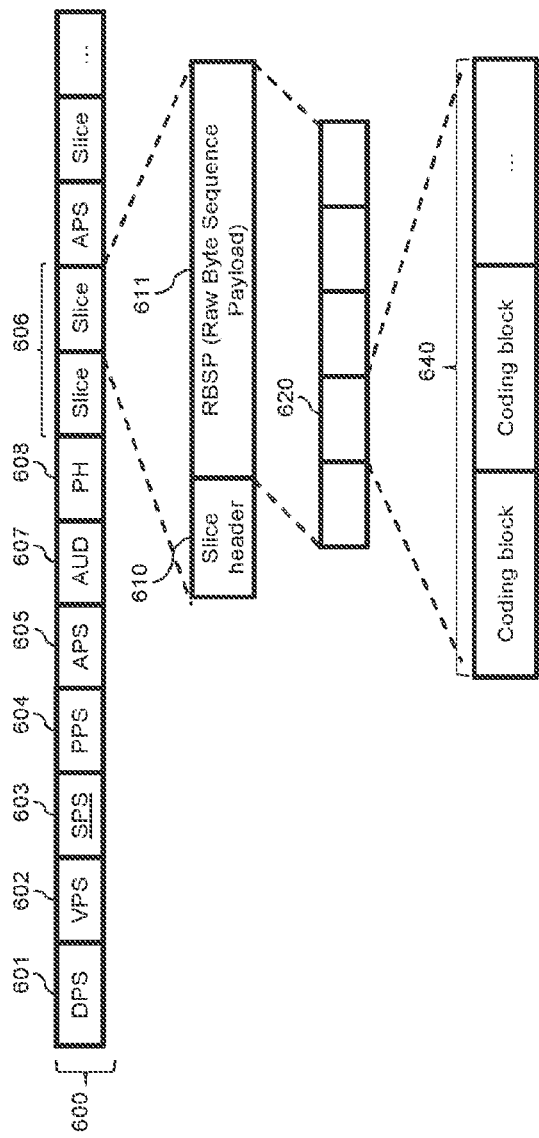
FIG. 6 illustrates the structure of the bitstream in the exemplary coding system VVC

FIG. 6 illustrates the organisation of the bitstream in the exemplary coding system VVC as describe in JVET-Q2001-vD.

A bitstream 61 according to the VVC coding system is composed of an ordered sequence of syntax elements and coded data. The syntax elements and coded data are placed into Network Abstraction Layer (NAL) units 601-608. There are different NAL unit types. The network abstraction layer provides the ability to encapsulate the bitstream into different protocols, like RTP/IP, standing for Real Time Protocol/ Internet Protocol, ISO Base Media File Format, etc. The network abstraction layer also provides a framework for packet loss resilience.

NAL units are divided into Video Coding Layer (VCL) NAL units and non-VCL NAL units. The VCL NAL units contain the actual encoded video data. The non-VCL NAL units contain additional information. This additional information may be parameters needed for the decoding of the encoded video data or supplemental data that may enhance usability of the decoded video data. NAL units 606 correspond to slices and constitute the VCL NAL units of the bitstream.

Different NAL units 601-605 correspond to different parameter sets, these NAL units are non-VCL NAL units. The Decoder Parameter Set (DPS) NAL unit 301 contains parameters that are constant for a given decoding process.

The Video Parameter Set (VPS) NAL unit 602 contains parameters defined for the whole video, and thus the whole bitstream. The DPS NAL unit may define parameters more static than the parameters in the VPS. In other words, the parameters of DPS change less frequently than the parameter of the VPS.

The Sequence Parameter Set (SPS) NAL unit 603 contains parameters defined for a video sequence. In particular, the SPS NAL unit may define the subpictures layout and associated parameters of the video sequences. The parameters associated to each subpicture specifies the coding constraints applied to the subpicture. In particular, it comprises a flag indicating that the temporal prediction between subpictures is restricted to the data coming from the same subpicture. Another flag may enable or disable the loop filters across the subpicture boundaries.

The Picture Parameter Set (PPS) NAL unit 604, PPS contains parameters defined for a picture or a group of pictures. The Adaptation Parameter Set (APS) NAL unit 605, contains parameters for loop filters typically the Adaptive Loop Filter (ALF) or the reshaper model (or luma mapping with chroma scaling (LMCS) model) or the scaling matrices that are used at the slice level.

The syntax of the PPS as proposed in the current version of VVC comprises syntax elements that specifies the size of the picture in luma samples and also the partitioning of each picture in tiles and slices.

The PPS contains syntax elements that make it possible to determine the slices location in a frame. Since a subpicture forms a rectangular region in the frame, it is possible to determine the set of slices, the parts of tiles or the tiles that belong to a subpicture from the Parameter Sets NAL units. The PPS as with the APS have an ID mechanism to limit the amount of same PPS's transmitted.

The main difference between the PPS and Picture Header is it transmission, the PPS is generally transmitted for a group of pictures compared to the PH which is systematically transmitted for each Picture. Accordingly, the PPS compared to the PH contains parameters which can be constant for several picture.

The bitstream may also contain Supplemental Enhancement Information (SEI) NAL units (not represented in FIG. 6). The periodicity of occurrence of these parameter sets in the bitstream is variable. A VPS that is defined for the whole bitstream may occur only once in the bitstream. To the contrary, an APS that is defined for a slice may occur once for each slice in each picture. Actually, different slices may rely on the same APS and thus there are generally fewer APS than slices in each picture. In particular, the APS is defined in the picture header. Yet, the ALF APS can be refined in the slice header.

The Access Unit Delimiter (AUD) NAL unit 607 separates two access units. An access unit is a set of NAL units which may comprise one or more coded pictures with the same decoding timestamp. This optional NAL unit contains only one syntax element in current VVC specification: pic_type, this syntax element indicates that the slice_type values for all slices of the coded pictures in the AU. If pic_type is set equal to 0, the AU contain only Intra slice. If equal to 1, it contains P and I slices. If equal to 2 it contains B, P or Intra slice This NAL unit contains only one syntax element the pic_type.

TABLE 1

Syntax AUD

| | Descriptor |
|---|---|
| access_unit_delimiter_rbsp( ) { | |
|   pic_type | u(3) |
|   rbsp_trailing_bits( ) | |
| } | |

In JVET-Q2001-vD the pic_type is defined as follow:

"pic_type indicates that the slice_type values for all slices of the coded pictures in the AU containing the AU delimiter NAL unit are members of the set listed in Table 2 for the given value of pic_type. The value of pic_type shall be equal to 0, 1 or 2 in bitstreams conforming to this version of this Specification. Other values of pic_type are reserved for future use by ITU-T|ISO/JEC. Decoders conforming to this version of this Specification shall ignore reserved values of pic_type."

The rbsp_trailing_bits( ) is a function which adds bits in order to be aligned to the end of a byte. So after, this function, the amount of bitstream parsed is an integer number of bytes.

TABLE 2

Interpretation of pic_type

| pic_type | slice_type values that may be present in the AU |
|---|---|
| 0 | I |
| 1 | P, I |
| 2 | B, P, I |

The PH NAL unit 608 is the Picture Header NAL unit which groups parameters common to a set of slices of one coded picture. The picture may refer to one or more APS to indicate the AFL parameters, reshaper model and the scaling matrices used by the slices of the Picture.

Each of the VCL NAL units 606 contains a slice. A slice may correspond to the whole picture or subpicture, a single tile or a plurality of tiles or a fraction of a tile. For example the slice of the FIG. 6 contains several tiles 620. A slice is composed of a slice header 610 and a raw byte sequence payload, RBSP 611 that contains the coded pixels data encoded as coded blocks 640.

The syntax of the PPS as proposed in the current version of VVC comprises syntax elements that specifies the size of the picture in luma samples and also the partitioning of each picture in tiles and slices.

The PPS contains syntax elements that make it possible to determine the slices location in a frame. Since a subpicture forms a rectangular region in the frame, it is possible to determine the set of slices, the parts of tiles or the tiles that belong to a subpicture from the Parameter Sets NAL units.

NAL Unit Slice

The NAL unit slice layer contains the slice header and the slice data as illustrated in Table 3.

TABLE 3

Slice layer syntax

| | Descriptor |
|---|---|
| slice_layer_rbsp( ) { | |
|   slice_header( ) | |
|   slice_data( ) | |
|   rbsp_slice_trailing_bits( ) | |
| } | |

APS

The Adaptation Parameter Set (APS) NAL unit 605, is defined in Table 4 showing the syntax elements.

As depicted in table Table 4, there are 3 possible types of APS given by the aps_params_type syntax element:

ALF_AP: for the ALF parameters

LMCS_APS for the LMCS parameters

SCALING_APS for Scaling list relative parameters

TABLE 4

Adaptation parameter set syntax

| | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |
|     alf_data( ) | |
|   else if( aps_params_type = = LMCS_APS ) | |
|     lmcs_data( ) | |
|   else if( aps_params_type = = SCALING_APS ) | |
|     scaling_list_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

These three types of APS parameters are discussed in turn below

ALF APS

The ALF parameters are described in Adaptive loop filter data syntax elements (Table 5). First, four flags are dedicated to specify whether or not the ALF filters are transmitted for Luma and/or for Chroma and if the CC-ALF (Cross Component Adaptive Loop Filtering) is enabled for Cb component and Cr component. If the Luma filter flag is enabled, another flag is decoded to know if the clip values are signalled (alf_luma_clip_flag). Then the number of filters signalled is decoded using the alf_luma_num_filters_signalled_minus1 syntax element. If needed, the syntax element representing the ALF coefficients delta "alf_luma_coeff_delta_idx" is decoded for each enabled filter. Then absolute value and the sign for each coefficient of each filter are decoded.

If the alf_luma_clip_flag is enabled, the clip index for each coefficient of each enabled filter is decoded.

In the same way, the ALF chroma coefficients are decoded if needed.

If CC-ALF is enabled for Cr or Cb the number of filter are decoded (alf_cc_cb_filters_signalled_gminus1 or alf_cc_cr_ filters_signalled_minus1) and the related coefficients are decoded (alf_cc_cb_mapped_coeff_abs and alf_cc_cb_coeff_sign or respectively alf_cc_cr_mapped_coeff_abs and alf_cc_cr_coeff_sign)

TABLE 5

Adaptive loop filter data syntax

| | Descriptor |
|---|---|
| alf_data( ) { | |
|   alf_luma_filter_signal_flag | u(1) |
|   alf_chroma_filter_signal_flag | u(1) |
|   alf_cc_cb_filter_signal_flag | u(1) |
|   alf_cc_cr_filter_signal_flag | u(1) |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) | |
|       for( filtIdx = 0; filtIdx < NumAlfFilters; filtIdx++ ) | |
|         alf_luma_coeff_delta_idx[ filtIdx ] | u(v) |
|     for( sfIdx = 0; sfIdx <= alf_luma_num_filters_signalled_minus1; sfIdx++ ) | |
|       for( j = 0; j < 12; j++ ) { | |
|         alf_luma_coeff_abs[ sfIdx ][ j ] | ue(v) |
|         if( alf_luma_coeff_abs[ sfIdx ][ j ] ) | |
|           alf_luma_coeff_sign[ sfIdx ][ j ] | u(1) |
|       } | |
|     if( alf_luma_clip_flag ) | |
|       for( sfIdx = 0; sfIdx <= alf_luma_num_filters_signalled_minus1; sfIdx++ ) | |
|         for( j = 0; j < 12; j++ ) | |
|           alf_luma_clip_idx[ sfIdx ][ j ] | u(2) |
|   } | |
|   if( alf_chroma_filter_signal_flag ) { | |
|     alf_chroma_clip_flag | u(1) |
|     alf_chroma_num_alt_filters_minus1 | ue(v) |
|     for( altIdx = 0; altIdx <= alf_chroma_num_alt_filters_minus1; altIdx++ ) { | |
|       for( j = 0; j < 6; j++ ) { | |
|         alf_chroma_coeff_abs[ altIdx ][ j ] | ue(v) |
|         if( alf_chroma_coeff_abs[ altIdx ][ j ] > 0 ) | |
|           alf_chroma_coeff_sign[ altIdx ][ j ] | u(1) |
|       } | |
|       if( alf_chroma_clip_flag ) | |
|         for( j = 0; j < 6; j++ ) | |
|           alf_chroma_clip_idx[ altIdx ][ j ] | u(2) |
|     } | |
|   } | |
|   if( alf_cc_cb_filter_signal_flag ) { | |
|     alf_cc_cb_filters_signalled_minus1 | ue(v) |
|     for( k = 0; k < alf_cc_cb_filters_signalled_minus1 + 1; k++ ) { | |
|       for( j = 0; j < 7; j++ ) { | |
|         alf_cc_cb_mapped_coeff_abs[ k ][ j ] | u(3) |
|         if( alf_cc_cb_mapped_coeff_abs[ k ][ j ] ) | |
|           alf_cc_cb_coeff_sign[ k ][ j ] | u(1) |
|       } | |
|     } | |
|   } | |
|   if( alf_cc_cr_filter_signal_flag ) { | |
|     alf_cc_cr_filters_signalled_minus1 | ue(v) |
|     for( k = 0; k < alf_cc_cr_filters_signalled_minus1 + 1; k++ ) { | |
|       for( j = 0; j < 7; j++ ) { | |
|         alf_cc_cr_mapped_coeff_abs[ k ][ j ] | u(3) |
|         if( alf_cc_cr_mapped_coeff_abs[ k ][ j ] ) | |
|           alf_cc_cr_coeff_sign[ k ][ j ] | u(1) |
|       } | |
|     } | |
|   } | |
| } | |

LMCS Syntax Elements for Both Luma Mapping and Chroma Scaling

The Table 6 below gives all the LMCS syntax elements which are coded in the adaptation parameter set (APS) syntax structure when the aps_params_type parameter is set to 1 (LMCS_APS). Up to four LMCS APS's can be used in a coded video sequence, however, only a single LMCS_APS can be used for a given picture.

These parameters are used to build the forward and inverse mapping functions for Luma and the scaling function for Chroma.

TABLE 6

Luma mapping with chroma scaling data syntax

| | Descriptor |
|---|---|
| lmcs_data( ) { | |
|   lmcs_min_bin_idx | ue(v) |
|   lmcs_delta_max_bin_idx | ue(v) |
|   lmcs_delta_cw_prec_minus1 | ue(v) |
|   for( i = lmcs_min_bin_idx; i <= LmcsMaxBinIdx; i++ ) { | |
|     lmcs_delta_abs_cw[ i ] | u(v) |
|     if( lmcs_delta_abs_cw[ i ] > 0 ) | |
|       lmcs_delta_sign_cw_flag[ i ] | u(1) |
|   } | |
|   lmcs_delta_abs_crs | u(3) |
|   if( lmcs_delta_abs_crs > 0 ) | |
|     lmcs_delta_sign_crs_flag | u(1) |
| } | |

Scaling List APS

The scaling list offers the possibility to update the quantization matrix used for quantification. In VVC this scaling matrix is signalled in the APS as described in Scaling list data syntax elements (
Table 7 Scaling list data syntax). The first syntax element specifies if the scaling matrix is used for the LFNST (Low Frequency Non-Separable Transform) tool based on the flag scaling_matrix_for_lfnst_disabled_flag. The second one is specified if the scaling list are used for Chroma components (scaling_list_chroma_present_flag). Then the syntax elements needed to build the scaling matrix are decoded (scaling_list_copy_mode_flag, scaling_list_pred_mode_flag, scaling_list_pred_id_delta, scaling_list_dc_coef, scaling_list_delta_coef).

TABLE 7

Scaling list data syntax

| | Descriptor |
|---|---|
| scaling_list_data( ) { | |
|   scaling_matrix_for_lfnst_disabled_flag | u(1) |
|   scaling_list_chroma_present_flag | u(1) |
|   for( id = 0; id < 28; id ++ ) | |
|     matrixSize = (id < 2 ) ? 2 : ( ( id < 8 ) ? 4 : 8 ) | |
|     if( scaling_list_chroma_present_flag | | | |
|   ( id % 3 = = 2 ) | | ( id = = 27 ) ) { | |
|     scaling_list_copy_mode_flag[ id ] | u(1) |
|     if( !scaling_list_copy_mode_flag[ id ] ) | |
|       scaling_list_pred_mode_flag[ id ] | u(1) |
|     if( ( scaling_list_copy_mode_flag[ id ] | | | |
|     scaling_list_pred_mode_flag[ id ] ) && | |
|       id != 0 && id != 2 && id != 8 ) | |
|       scaling_list_pred_id_delta[ id ] | ue(v) |
|     if( !scaling_list_copy_mode_flag[ id ] ) { | |
|       nextCoef = 0 | |
|       if( id > 13 ) { | |
|         scaling_list_dc_coef[ id − 14 ] | se(v) |
|         nextCoef += scaling_list_dc_coef[ id − 14 ] | |
|       } | |
|       for( i = 0; i < matrixSize * matrixSize; i++ ) { | |
|         x = DiagScanOrder[ 3 ][ 3 ][ i ][ 0 ] | |
|         y = DiagScanOrder[ 3 ][ 3 ][ i ][ 1 ] | |
|         if( !( id > 25 && x >= 4 && y >= 4 ) ) { | |
|           scaling_list_delta_coef[ id ][ i ] | se(v) |
|           nextCoef += scaling_list_delta_coef[ id ][ i ] | |
|         } | |
|         ScalingList[ id ][ i ] = nextCoef | |
|       } | |
|     } | |

TABLE 7-continued

Scaling list data syntax

| | Descriptor |
|---|---|
|     } | |
|   } | |
| } | |

Picture Header

The picture header is transmitted at the beginning of each picture before the other Slice Data. This is very large compared to the previous headers in the previous drafts of the standard. A complete description of all these parameters can be found in JVET-Q2001-vD. Table 10 shows these parameters in the current picture header decoding syntax. The related syntax elements which can be decoded are related to:

the usage of this picture, reference frame or not
  The type of picture
  output frame
  The number of the Picture
  subpicture usage if needed
  reference picture lists if needed
  colour plane if needed
  partitioning update if overriding flag is enabled
  delta QP parameters if needed
  Motion information parameters if needed
  ALF parameters if needed
  SAO parameters if needed
  quantification parameters if needed
  LMCS parameters if needed
  Scaling list parameters if needed
  picture header extension if needed
  Etc. . . .

Picture "Type"

The first flag is the gdr_or_irap_pic_flag which indicates if the current picture is a resynchronisation picture (IRAP or GDR). If this flag is true, the gdr_pic_flag is decoded to know if the current picture is an IRAP or a GDR picture.

Then the ph_inter_slice_allowed_flag is decoded to identify that the Inter slice is allowed.

When they are allowed, the flag ph_intra_slice_allowed_flag is decoded to know if the Intra slice are allowed for the current picture.

Then the non_reference_picture_flag, the ph_pic_parameter_set_id indicating the PPS ID and the picture order count ph_pic_order_cnt_lsb are decoded. The picture order count gives the number of the current picture.

If the picture is a GDR or an IRAP picture, the flag no_output_of_prior_pics_flag is decoded.

And if the picture is a GDR the recovery_poc_cnt is decoded. Then ph_poc_msb_present_flag and poc_msb_val are decoded if needed.

ALF

After these parameters describing important information on the current picture, the set of ALF APS id syntax elements are decoded if ALF is enabled at SPS level and if ALF is enabled at picture header level. ALF is enabled at SPS level thanks to the sps_alf_enabled_flag flag. And ALF signalling is enabled at picture header level thanks to the alf_info_in_ph_flag equal to 1 otherwise (alf_info_in_ph_flag equal to 0) ALF is signalled at slice level.

The alf_info_in_ph_flag is defined as the following:

"alf_info_in_ph_flag equal to 1 specifies that ALF information is present in the PH syntax structure and not present in slice headers referring to the PPS that do not contain a PH syntax structure. alf_info_in_ph_flag equal to 0 specifies that ALF information is not present in the PH syntax structure and may be present in slice headers referring to the PPS that do not contain a PH syntax structure."

First the ph_alf_enabled_present_flag is decoded to determine whether or not if the ph_alf_enabled_flag should be decoded. If the ph_alf_enabled_flag is enabled, ALF is enabled for all slices of the current picture.

If ALF is enabled, the amount of ALF APS id for luma is decoded using the pic_num_alf_aps_ids_luma syntax element. For each APS id, the APS id value for luma is decoded "ph_alf_aps_id_luma".

For chroma the syntax element, ph_alf_chroma_idc is decoded to determine whether or not ALF is enabled for Chroma, for Cr only, or for Cb only. If it is enabled, the value of the APS ID for Chroma is decoded using the ph_alf_aps_id_chroma syntax element.

In the way the APS ID for CC-ALF method are decoded if needed for Cb and/or CR components

LMCS

The set of LMCS_APS ID syntax elements is then decoded if LMCS was enabled at SPS level. First the ph_lmcs_enabled_flag is decoded to determine whether or not LMCS is enabled for the current picture. If LMCS is enabled, the ID value is decoded ph_lmcs_aps_id. For Chroma only the ph_chroma_residual_scale_flag is decoded to enable or disable the method for Chroma.

Scaling List

The set of scaling list APS ID is then decoded if the scaling list is enabled at SPS level. The ph_scaling_list_present_flag is decoded to determine whether or not the scaling matrix is enabled for the current picture. And the value of the APS ID, ph_scaling_list_aps_id, is then decoded.

Subpicture

The Subpicture parameters are enabled when they are enabled at SPS and if the subpicture id signalling is disabled. It also contains some information on virtual boundaries. For the subpicture parameters eight syntax elements are defined:
    ph_virtual_boundaries_present_flag
    ph_num_ver_virtual_boundaries
    ph_virtual_boundaries_pos_x[i]
    ph_num_hor_virtual_boundaries
    ph_virtual_boundaries_pos_y[i]

Output Flag

These subpicture parameters are followed by the pic_output_flag if present.

Reference Picture Lists

If the reference picture lists are signalled in the picture header (thanks to rpl_info_in_ph_flag equal to 1), then the parameters for the reference picture lists are decoded ref_pic_lists( ) it contains the following syntax elements:
    rpl_sps_flag[ ]
    rpl_idx[ ]
    poc_lsb_lt[ ][ ]
    delta_poc_msb_present_flag[ ][ ]
    delta_poc_msb_cycle_lt[ ][ ]

And it is defined in following syntax table:

TABLE 8

| Reference picture lists syntax | Descriptor |
|---|---|
| ref_pic_lists( ) { | |
|   for( i = 0; i < 2; i++ ) { | |
|     if( num_ref_pic_lists_in_sps[ i ] > 0 && | |

TABLE 8-continued

| Reference picture lists syntax | Descriptor |
|---|---|
|     ( i == 0 \|\| ( i == 1 && | |
|     rpl1_idx_present_flag ) ) ) | |
|     rpl_sps_flag[ i ] | u(1) |
|   if( rpl_sps_flag[ i ] ) { | |
|     if( num_ref_pic_lists_in_sps[ i ] > 1 && | |
|     ( i == 0 \|\| ( i == 1 && | |
|     rpl1_idx_present_flag ) ) ) | |
|     rpl_idx[ i ] | u(v) |
|   } else | |
|     ref_pic_list_struct( i, | |
|     num_ref_pic_lists_in_sps[ i ] ) | |
|   for( j = 0; j < NumLtrpEntries[ i ][ RplsIdx[ i ] ]; | |
|   j++ ) { | |
|     if( ltrp_in_header_flag[ i ][ RplsIdx[ i ] ] ) | |
|     poc_lsb_lt[ i ][ j ] | u(v) |
|     delta_poc_msb_present_flag[ i ][ j ] | u(1) |
|     if( delta_poc_msb_present_flag[ i ][ j ] ) | |
|     delta_poc_msb_cycle_lt[ i ][ j ] | ue(v) |
|   } | |
| } | |
| } | |

Partitioning

The set of partitioning parameters is decoded if needed and contains the following syntax elements:
    partition_constraints_override_flag
    ph_log_2_diff_min_qt_min_cb_intra_slice_luma
    ph_max_mtt_hierarchy_depth_intra_slice_luma
    ph_log_2_diff_max_bt_min_qt_intra_slice_luma
    ph_log_2_diff_max_tt_min_qt_intra_slice_luma
    ph_log_2_diff_min_qt_min_cb_intra_slice_chroma
    ph_max_mtt_hierarchy_depth_intra_slice_chroma
    ph_log_2_diff_max_bt_min_qt_intra_slice_chroma
    ph_log_2_diff_max_tt_min_qt_intra_slice_chroma
    ph_log_2_diff_min_qt_min_cb_inter_slice
    ph_max_mtt_hierarchy_depth_inter_slice
    ph_log_2_diff_max_bt_min_qt_inter_slice
    ph_log_2_diff_max_tt_min_qt_inter_slice Weighted Prediction The weighted prediction parameters pred_weight_table( ) are decoded if the weighted prediction method is enabled at PPS level and if the weighted prediction parameters are signalled in the picture header (wp_info_in_ph_flag equal to 1).

The pred_weight_table( ) contains the weighted prediction parameters for List L0 and for list L1 when bi-prediction weighted prediction is enabled. When the weighted prediction parameters are transmitted in the picture header the number of weights for each list are explicitly transmitted as depicted in the pred_weight_table( ) syntax table Table 9.

TABLE 9

| Weighted prediction parameters syntax | Descriptor |
|---|---|
| pred_weight_table( ) { | |
|   luma_log2_weight_denom | ue(v) |
|   if( ChromaArrayType != 0 ) | |
|     delta_chroma_log2_weight_denom | se(v) |
|   if( wp_info_in_ph_flag ) | |
|     num_l0_weights | ue(v) |
|   for( i = 0; i < NumWeightsL0; i++ ) | |
|     luma_weight_l0_flag[ i ] | u(1) |
|   if( ChromaArrayType != 0 ) | |
|     for( i = 0; i < NumWeightsL0; i++ ) | |

TABLE 9-continued

Weighted prediction parameters syntax

| | Descriptor |
|---|---|
| chroma_weight_l0_flag[ i ] | u(1) |
| for( i = 0; i < NumWeightsL0; i++ ) { | |
|   if( luma_weight_l0_flag[ i ] ) { | |
|     delta_luma_weight_l0[ i ] | se(v) |
|     luma_offset_l0[ i ] | se(v) |
|   } | |
|   if( chroma_weight_l0_flag[ i ] ) | |
|     for( j = 0; j < 2; j++ ) { | |
|       delta_chroma_weight_l0[ i ][ j ] | se(v) |
|       delta_chroma_offset_l0[ i ][ j ] | se(v) |
|     } | |
| } | |
| if( pps_weighted_bipred_flag && wp_info_in_ph_flag ) | |
|   num_l1_weights | ue(v) |
| for( i = 0; i < NumWeightsL1; i++ ) | |
|   luma_weight_l1_flag[ i ] | u(1) |
| if( ChromaArrayType != 0 ) | |
|   for( i = 0; i < NumWeightsL1; i++ ) | |
|     chroma_weight_l1_flag[ i ] | u(1) |
| for( i = 0; i < NumWeightsL1; i++ ) { | |
|   if( luma_weight_l1_flag[ i ] ) { | |
|     delta_luma_weight_l1[ i ] | se(v) |
|     luma_offset_l1[ i ] | se(v) |
|   } | |
|   if( chroma_weight_l1_flag[ i ] ) | |
|     for( j = 0; j < 2 ; j++ ) { | |
|       delta_chroma_weight_l1[ i ][ j ] | se(v) |
|       delta_chroma_offset_l1[ i ][ j ] | se(v) |
|     } | |
| } | |

Delta QP

When the picture is Intra the ph_cu_cp_delta_subdiv_intra_slice and the ph_cu_chroma_qp_offset_subdiv_intra_slice are decoded if needed. And if Inter slice is allowed the ph_cu_qp_delta_subdiv_inter_slice and the ph_cu_chroma_qp_offset_subdiv_inter_slice are decoded if needed. Finally, the picture header extension syntax elements are decoded if needed.

All parameters alf_info_in_ph_flag, rpl_info_in_ph_flag, qp_delta_info_in_ph_flag sao_info_in_ph_flag, dbf_info_in_ph_flag, wp_info_in_ph_flag are signalled in the PPS.

TABLE 10

Picture header structure

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
|   for( i = 0; i < NumExtraPhBits; i++ ) | |
|     ph_extra_bit[ i ] | u(1) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) | |
|         ph_alf_chroma_idc | u(2) |
|       if( ph_alf_chroma_idc > 0 ) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag ) | |
|           ph_cc_alf_cb_aps_id | u(3) |
|         ph_cc_alf_cr_enabled_flag | u(1) |
|         if( ph_cc_alf_cr_enabled_flag ) | |
|           ph_cc_alf_cr_aps_id | u(3) |
|       } | |
|     } | |
|   } | |
|   if( sps_lmcs_enabled_flag ) { | |
|     ph_lmcs_enabled_flag | u(1) |
|     if( ph_lmcs_enabled_flag ) { | |

TABLE 10-continued

| Picture header structure | |
|---|---|
| | Descriptor |
|     ph_lmcs_aps_id | u(2) |
|     if( ChromaArrayType != 0 ) | |
|       ph_chroma_residual_scale_flag | u(1) |
|   } | |
| } | |
| if( sps_scaling_list_enabled_flag ) { | |
|   ph_scaling_list_present_flag | u(1) |
|   if( ph_scaling_list_present_flag ) | |
|     ph_scaling_list_aps_id | u(3) |
| } | |
| if( sps_virtual_boundaries_enabled_flag && !sps_virtual_boundaries_present_flag ) { | |
|   ph_virtual_boundaries_present_flag | u(1) |
|   if( ph_virtual_boundaries_present_flag ) { | |
|     ph_num_ver_virtual_boundaries | u(2) |
|     for( i = 0; i < ph_num_ver_virtual_boundaries; i++ ) | |
|       ph_virtual_boundaries_pos_x[ i ] | u(13) |
|     ph_num_hor_virtual_boundaries | u(2) |
|     for( i = 0; i < ph_num_hor_virtual_boundaries; i++ ) | |
|       ph_virtual_boundaries_pos_y[ i ] | u(13) |
|   } | |
| } | |
| if( output_flag_present_flag ) | |
|   pic_output_flag | u(1) |
| if( rpl_info_in_ph_flag ) | |
|   ref_pic_lists( ) | |
| if( partition_constraints_override_enabled_flag ) | |
|   partition_constraints_override_flag | u(1) |
| if( ph_intra_slice_allowed_flag ) { | |
|   if( partition_constraints_override_flag ) { | |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma != 0 ) { | |
|       ph_log2_diff_max_bt_min_qt_intra_slice_luma | ue(v) |
|       ph_log2_diff_max_tt_min_qt_intra_slice_luma | ue(v) |
|     } | |
|     if( qtbtt_dual_tree_intra_flag ) { | |
|       ph_log2_diff_min_qt_min_cb_intra_slice_chroma | ue(v) |
|       ph_max_mtt_hierarchy_depth_intra_slice_chroma | ue(v) |
|       if( ph_max_mtt_hierarchy_depth_intra_slice_chroma != 0 ) { | |
|         ph_log2_diff_max_bt_min_qt_intra_slice_chroma | ue(v) |
|         ph_log2_diff_max_tt_min_qt_intra_slice_chroma | ue(v) |
|       } | |
|     } | |
|   } | |
|   if( cu_qp_delta_enabled_flag ) | |
|     ph_cu_qp_delta_subdiv_intra_slice | ue(v) |
|   if( pps_cu_chroma_qp_offset_list_enabled_flag ) | |
|     ph_cu_chroma_qp_offset_subdiv_intra_slice | ue(v) |
| } | |
| if( ph_inter_slice_allowed_flag ) { | |
|   if( partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && rpl_info_in_ph_flag ) { | |
|       ph_collocated_from_l0_flag | u(1) |
|       if( ( ph_collocated_from_l0_flag && | |
|         num_ref_entries[ 0 ][ RplsIdx[ 0 ] ] > 1 ) \|\| | |
|         ( !ph_collocated_from_l0_flag && | |
|         num_ref_entries[ 1 ][ RplsIdx[ 1 ] ] > 1 ) ) | |
|         ph_collocated_ref_idx | ue(v) |
|     } | |
|   } | |
|   mvd_l1_zero_flag | u(1) |
|   if( sps_fpel_mmvd_enabled_flag ) | |

TABLE 10-continued

Picture header structure

| | Descriptor |
|---|---|
| ph_fpel_mmvd_enabled_flag | u(1) |
| if( sps_bdof_pic_present_flag ) | |
|   ph_disable_bdof_flag | u(1) |
| if( sps_dmvr_pic_present_flag ) | |
|   ph_disable_dmvr_flag | u(1) |
| if( sps_prof_pic_present_flag ) | |
|   ph_disable_prof_flag | u(1) |
| if( ( pps_weighted_pred_flag \|\| pps_weighted_bipred_flag ) && wp_info_in_ph_flag ) | |
|   pred_weight_table( ) | |
| } | |
| if( qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( sps_dep_quant_enabled_flag ) | |
|   ph_dep_quant_enabled_flag | u(1) |
| if( sps_sign_data_hiding_enabled_flag && !ph_dep_quant_enabled_flag ) | |
|   pic_sign_data_hiding_enabled_flag | u(1) |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|     } | |
|   } | |
| } | |
| if( picture_header_extension_present_flag ) { | |
|   ph_extension_length | ue(v) |
|   for( i = 0; i < ph_extension_length; i++) | |
|     ph_extension_data_byte[ i ] | u(8) |
| } | |
| } | |

Slice Header

The Slice header is transmitted at the beginning of each slice. The slice header contains about 65 syntax elements. This is very large compared to the previous slice header in earlier video coding standards. A complete description of all the slice header parameters can be found in JVET-Q2001-vD. Table 11 shows these parameters in a current slice header decoding syntax.

TABLE 11

Partial Slice header

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag && NumTilesInPic > 1 ) | |
|     num_tiles_in_slice_minus1 | ue(v) |
|   if( ph_inter_slice_allowed_flag ) | |
|     slice_type | ue(v) |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag ) | |

TABLE 11-continued

Partial Slice header

| | Descriptor |
|---|---|
| slice_cc_alf_cb_aps_id | u(3) |
| slice_cc_alf_cr_enabled_flag | u(1) |
| if( slice_cc_alf_cr_enabled_flag ) | |
| slice_cc_alf_cr_aps_id | u(3) |
| } | |
| } | |
| } | |
| if( separate_colour_plane_flag = = 1 ) | |
| colour_plane_id | u(2) |
| if( !rpl_info_in_ph_flag && ( ( nal_unit_type != | |
| IDR_W_RADL && nal_unit_type != | |
| IDR_N_LP ) \| \| sps_idr_rpl_present_flag ) ) | |
| ref_pic_lists( ) | |
| if( ( rpl_info_in_ph_flag \| \| ( ( nal_unit_type != | |
| IDR_W_RADL && nal_unit_type != | |
| IDR_N_LP ) \| \| sps_idr_rpl_present_flag ) ) && | |
| ( slice_type != I && num_ref_entries[ 0 ][ | |
| RplsIdx[ 0 ] ] > 1 ) \| \| | |
| ( slice_type = = B && num_ref_entries[ 1 ][ | |
| RplsIdx[ 1 ] ] > 1 ) ) { | |
| num_ref_idx_active_override_flag | u(1) |
| if( num_ref_idx_active_override_flag ) | |
| for( i = 0; i < ( slice_type = = B ? 2: 1 ); i++ ) | |
| if( num_ref_entries[ i ][ RplsIdx[ i ] ] > 1 ) | |
| num_ref_idx_active_minus1[ i ] | ue(v) |
| } | |
| if( slice_type != I ) { | |
| if( cabac_init_present_flag ) | |
| cabac_init_flag | u(1) |
| if( ph_temporal_mvp_enabled_flag && | |
| !rpl_info_in_ph_flag ) { | |
| if( slice_type = = B ) | |
| slice_collocated_from_l0_flag | u(1) |
| if( ( slice_collocated_from_l0_flag && | |
| NumRefIdxActive[ 0 ] > 1 ) \| \| | |
| ( ! slice_collocated_from_l0_flag && | |
| NumRefIdxActive[ 1 ] > 1 ) ) | |
| slice_collocated_ref_idx | ue(v) |
| } | |
| if( !wp_info_in_ph_flag && (( | |
| pps_weighted_pred_flag && slice_type = = P ) \| \| | |
| ( pps_weighted_bipred_flag && | |
| slice_type = = B ) ) ) | |
| pred_weight_table( ) | |
| } | |
| if( !qp_delta_info_in_ph_flag ) | |
| slice_qp_delta | se(v) |
| if( pps_slice_chroma_qp_offsets_present_flag ) { | |
| slice_cb_qp_offset | se(v) |
| slice_cr_qp_offset | se(v) |
| if( sps_joint_cbcr_enabled_flag ) | |
| slice_joint_cbcr_qp_offset | se(v) |
| } | |
| if( pps_cu_chroma_qp_offset_list_enabled_flag ) | |
| cu_chroma_qp_offset_enabled_flag | u(1) |
| if( sps_sao_enabled_flag && !sao_info_in_ph_flag ) { | |
| slice_sao_luma_flag | u(1) |
| if( ChromaArrayType != 0 ) | |
| slice_sao_chroma_flag | u(1) |
| } | |
| if( deblocking_filter_override_enabled_flag && | |
| !dbf_info_in_ph_flag ) { | |
| slice_deblocking_filter_override_flag | u(1) |
| if( slice_deblocking_filter_override_flag ) { | |
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| slice_cb_beta_offset_div2 | se(v) |
| slice_cb_tc_offset_div2 | se(v) |
| slice_cr_beta_offset_div2 | se(v) |
| slice_cr_tc_offset_div2 | se(v) |
| } | |
| } | |
| slice_ts_residual_coding_disabled_flag | u(1) |
| if( ph_lmcs_enabled_flag ) | |
| slice_lmcs_enabled_flag | u(1) |
| if( ph_scaling_list_enabled_flag ) | |
| slice_scaling_list_present_flag | u(1) |
| if( NumEntryPoints > 0 ) { | |
| offset_len_minus1 | ue(v) |
| for( i = 0; i < NumEntryPoints; i++ ) | |
| entry_point_offset_minus1[ i ] | u(v) |
| } | |
| if( slice_header_extension_present_flag ) { | |
| slice_header_extension_length | ue(v) |
| for( i = 0; i < slice_header_extension_length; i++) | |
| slice_header_extension_data_byte[ i ] | u(8) |
| } | |
| byte_alignment( ) | |
| } | |

First the picture_header_in_slice_header_flag is decoded to know if the picture_header_structure( ) is present in the slice header.

The slice_subpic_id is decoded if the subpic_info_present_flag was set equal to 1 in the SPS, The slice_subpic_id gives the subpicture id of the current slice. The subpic_info_present_flag is defined as the following in the current VVC specification:

"subpic_info_present_flag equal to 1 specifies that subpicture information is present for the CLVS and there may be one or more than one subpicture in each picture of the CLVS. subpic_info_present_flag equal to 0 specifies that subpicture information is not present for the CLVS and there is only one subpicture in each picture of the CLVS.

When res_change_in_clvs_allowed_flag is equal to 1, the value of subpic_info_present_flag shall be equal to 0."

Then the slice_address is decoded to determine the address of the current slice. The slice address is decoded if the current slice mode is the rectangular slice mode (rect_slice_flag equal to 1) and if the number of slices in the current subpicture is superior to 1. The slice address can be also decoded if the current slice mode is the raster scan mode (rect_slice_flag equal to 0) and if the number of tiles in the current picture is superior to 1 computed based on variables defined in the PPS.

The num_tiles_in_slice_minus1 is then decoded if the number of tiles in the current picture is greater than one and if the current slice mode is not the rectangular slice mode. In the current VVC draft specification, num_tiles_in_slice_minus1 is defined as follow:

"num_tiles_in_slice_minus1 plus 1, when present, specifies the number of tiles in the slice. The value of num_tiles_in_slice_minus1 shall be in the range of 0 to NumTilesInPic−1, inclusive."

Then the slice_type is decoded.

If ALF is enabled at SPS level (sps_alf_enabled_flag) and if ALF is signalled in the slice header (alf_info_in_ph_flag equal to 0), then ALF information is decoded. This includes a flag indicating that ALF is enabled for the current slice (slice_alf_enabled_flag). If it is enabled, the number of APS ALF ID for luma (slice_num_alf_aps_ids_luma) is decoded, then the APS ID are decoded (slice_alf_aps_id_luma[i]). Then the slice_alf_chroma_idc is decoded to know if ALF is enabled for the Chroma components and which chroma component it is enabled. Then the APS ID for Chroma is decoded slice_alf_aps_id_chroma if needed. In the same way, the slice_cc_alf_cb_enabled_flag is decoded, if needed, to know if the CC ALF method is enabled. IF CC ALF is enabled, the related APS ID for CR and/or CB are decoded if CC ALF is enabled for CR and/or CB.

If the colour planes are transmitted independently when separate_colour_plane_flag is set equal, to 1 the colour_plane_id is decoded. The separate_colour_plane_flag is defined as the following in the current VVC draft specification:

"separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value."

When the reference picture lists ref_pic_lists( ) are not transmitted in the picture header (rpl_info_in_ph_flag equal to 0) and when the Nal unit is not an IDR or if the reference pictures lists are transmitted for IDR pictures (sps_idr_rpl_present_flag equals to 1) then the Reference picture lists parameters are decoded; these are similar to those in the picture header.

If the reference picture lists are transmitted in the picture header (rpl_info_in_ph_flag equal to 1) or the Nal unit is not an IDR or if the reference picture lists are transmitted for IDR pictures (sps_idr_rpl_present_flag equals to 1) and if the number of reference for at least one list is superior to 1, the override flag num_ref_idx_active_override_flag is decoded. This flag is defined as the following in the VVC draft specification:

"num_ref_idx_active_override_flag equal to 1 specifies that the syntax element num_ref_idx_active_minus1[0] is present for P and B slices and the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present. When not present, the value of num_ref_idx_active_override_flag is inferred to be equal to 1."

If num_ref_idx_active_override_flag is enabled, the number of reference indexes num_ref_idx_active_minus1[i] for each list "i" are decoded if needed. The number of reference indexes override for the current list should be inferior or equal to the number of reference frames indexes signalled in the ref_pic_lists( ). So the overriding reduces or not the maximum number of reference frames for each list.

When the slice type is not intra and if needed the cabac_init_flag is decoded. If the reference picture lists are transmitted in the slice header and come other conditions, the slice_collocated_from_l0_flag and the slice_collocated_ref_idx are decoded. These data are related to the CABAC coding and the motion vector collocated.

In the same way, when the slice_type is not Intra, the parameters of the weighted prediction pred_weight_table( ) are decoded.

The slice_qp_delta is decoded bif the delta QP information is transmitted in the slice header (qp_delta_info_in_ph_flag equal to 0). If needed the syntax elements, slice_cb_qp_offset, slice_cr_qp_offset, slice_joint_cbcr_qp_offset, cu_chroma_qp_offset_enabled_flag are decoded.

If the SAO information are transmitted in the slice header (sao_info_in_ph_flag equal to 0) and if it is enabled at SPS level (sps_sao_enabled_flag), the enabled flags for SAO are decoded for both luma and chroma: slice_sao_luma_flag, slice_sao_chroma_flag.

Then the deblocking filter parameters are decoded if they are signalled in the slice header (dbf_info_in_ph_flag equal to 0).

The flag slice_ts_residual_coding_disabled_flag is systematically decoded to know if the Transform Skip residual coding method is enabled for the current slice.

If LMCS was enabled in the picture header (ph_lmcs_enabled_flag equal 1), the flag slice_lmcs_enabled_flag is decoded. In the current VVC specification the slice_lmcs_enabled_flag is defined as the following:

"slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0."

In the same way, if the scaling list was enabled in the picture header (phpic_scaling_list_presentenabled_flag equal 1), the flag slice_scaling_list_present_flag is decoded. In the current VVC specification, the slice_scaling_list_present_flag is defined as the following:

"slice_scaling_list_present_flag equal to 1 specifies that the scaling list data used for the current slice is derived based on the scaling list data contained in the referenced scaling list APS with aps_params_type equal to SCALING_APS and adaptation_parameter_set_id equal to ph_scaling_list_aps_id. slice_scaling_list_present_flag equal to 0 specifies that the scaling list data used for the current picture is the default scaling list data derived specified in clause 7.4.3.21. When not present, the value of slice_scaling_list_present_flag is inferred to be equal to 0."

Then other parameters are decoded if needed.

Picture Header in the Slice Header

Figure 7:
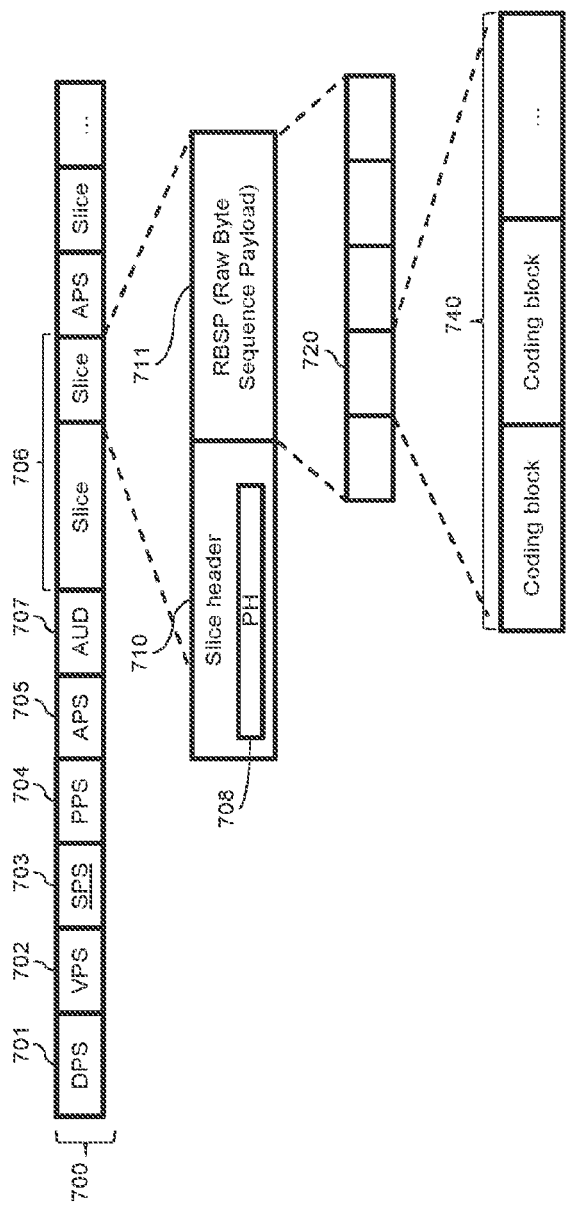
FIG. 7 illustrates another structure of the bitstream in the exemplary coding system VVC

In a particular signalling way, the picture header (708) can be signalled inside the slice header (710) as depicted in the FIG. 7. In that case there is no NAL unit containing only the picture header (608). The NAL units 701-707 correspond to the respective NAL units 601-607 in FIG. 6. Similarly, coding tiles 720 and coding blocks 740 correspond to the blocks 620 and 640 of FIG. 6. Accordingly, explanation of these units and blocks will not be repeated here. This can be enabled in the slice header thanks to the flag picture_header_in_slice_header_flag. Moreover, when the picture header is signalled inside the slice header, the picture shall contain only one slice. So, there is always only one picture header per picture. Moreover, the flag picture_header_in_slice_header_flag shall have the same value for all pictures of a CLVS (Coded Layer Video Sequence). It means that all pictures between two IRAP including the first IRAP has only one slice per picture.

The flag picture_header_in_slice_header_flag is defined as the following: "picture_header_in_slice_header_flag equal to 1 specifies that the PH syntax structure is present in the slice header. picture_header_in_slice_header_flag equal to 0 specifies that the PH syntax structure is not present in the slice header.

It is a requirement of bitstream conformance that the value of picture_header_in_slice_header_flag shall be the same in all coded slices in a CLVS.

When picture_header_in_slice_header_flag is equal to 1 for a coded slice, it is a requirement of bitstream conformance that no VCL NAL unit with nal_unit_type equal to PH_NUT shall be present in the CLVS.

When picture_header_in_slice_header_flag is equal to 0, all coded slices in the current picture shall have picture_header_in_slice_header_flag is equal to 0, and the current PU shall have a PH NAL unit.

The picture_header_structure( ) contains syntax elements of the picture_rbsp( ) except the stuffing bits rbsp_trailing_bits( )."

Streaming Applications

Some streaming applications only extract certain parts of the bitstream. These extractions can be spatial (as the sub-picture) or temporal (a subpart of the video sequence). Then these extracted parts can be merged with other bitstreams. Some other reduce the frame rate by extracting only some frames. Generally, the main aim of these streaming applications is to use the maximum of the allowed bandwidth to produce the maximum quality to the end user.

In VVC, the APS ID numbering has been limited for frame rate reduction, in order that a new APS id number for a frame can't be used for a frame at an upper level in the temporal hierarchy. However, for streaming applications which extract parts of the bitstream the APS ID needs to be tracked to determine which APS should be keep for a sub part of the bitstream as the frame (as IRAP) don't reset the numbering of the APS ID.

LMCS (Luma Mapping with Chroma Scaling)

The Luma Mapping with Chroma scaling (LMCS) technique is a sample value conversion method applied on a block before applying the loop filters in a video decoder like VVC.

The LMCS can be divided into two sub-tools. The first one is applied on Luma block while the second sub-tool is applied on Chroma blocks as described below:

1) The first sub-tool is an in-loop mapping of the Luma component based on adaptive piecewise linear models. The in-loop mapping of the Luma component adjusts the dynamic range of the input signal by redistributing the codewords across the dynamic range to improve compression efficiency. Luma mapping makes use of a forward mapping function into the "mapped domain" and a corresponding inverse mapping function to come back in the "input domain".

2) The second sub-tool is related to the chroma components where a luma-dependent chroma residual scaling is applied. Chroma residual scaling is designed to compensate for the interaction between the luma signal and its corresponding chroma signals. Chroma residual scaling depends on the average value of top and/or left reconstructed neighbouring luma samples of the current block.

Like most other tools in video coder like VVC, LMCS can be enabled/disabled at the sequence level using an SPS flag. Whether chroma residual scaling is enabled or not is also signalled at the slice level. If luma mapping is enabled, an additional flag is signalled to indicate if luma-dependent chroma residual scaling is enabled or not. When luma mapping is not used, luma-dependent chroma residual scaling is fully disabled. In addition, luma-dependent chroma residual scaling is always disabled for the chroma blocks whose size is less than or equal to 4.

Figure 8:
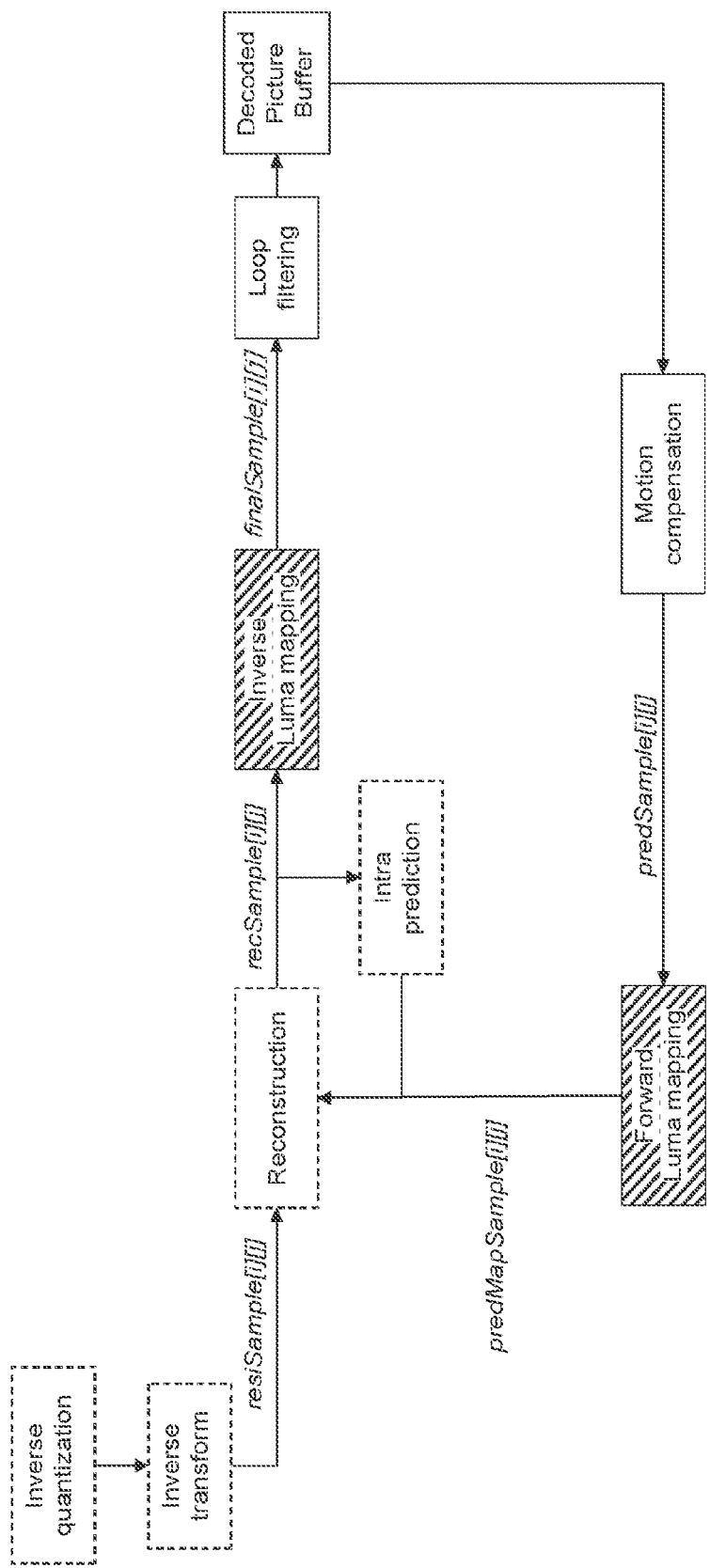
FIG. 8 illustrates Luma Modelling Chroma Scaling (LMCS)

FIG. 8 shows the principle of the LMCS as explained above for the Luma mapping sub-tool. The hatched blocks in FIG. 8 are the new LMCS functional blocks, including forward and inverse mapping of the luma signal. It is important to note that, when using LMCS, some decoding operations are applied in the "mapped domain". These operations are represented by blocks in dashed lines in this FIG. 8. They typically correspond to the inverse quantization, the inverse transform, the luma intra prediction and the reconstruction step which consists in adding the luma prediction with the luma residual. Conversely, the solid line blocks in FIG. 8 indicate where the decoding process is applied in the original (i.e., non-mapped) domain and this includes the loop filtering such as deblocking, ALF, and SAO, the motion compensated prediction, and the storage of decoded pictures as reference pictures (DPB).

Figure 9:
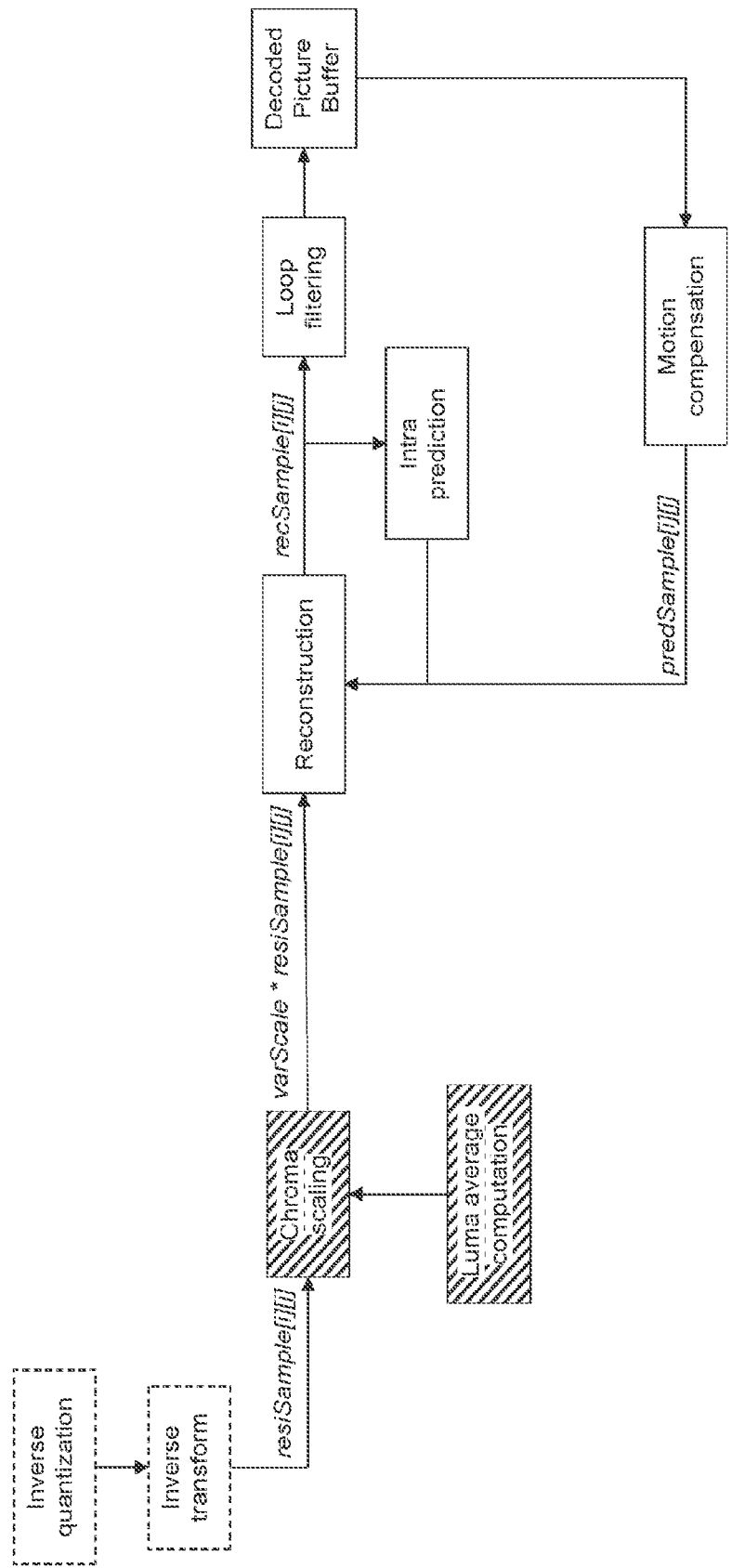
FIG. 9 shows a sub tool of LMCS.

FIG. 9 shows a similar diagram as FIG. 8 but this time this is for the Chroma scaling sub-tool of the LMCS tool. The hatched block in FIG. 9 is the new LMCS functional block which includes the luma-dependent chroma scaling process. However, in Chroma, there are some important differences compared to the Luma case. Here only the inverse quantization and the inverse transform represented by block in dash lines are performed in the "mapped domain" for the Chroma samples. All the other steps of Intra Chroma prediction, motion compensation, loop filtering are performed in the original domain. As depicted in FIG. 9, there is only a scaling process and there is no forward and inverse processing as for the Luma mapping.

Luma Mapping by Using Piece Wise Linear Model.

The luma mapping sub-tool is using a piecewise linear model. It means that the piecewise linear model separates the input signal dynamic range into 16 equal sub-ranges, and for each sub-range, its linear mapping parameters are expressed using the number of codewords assigned to that range.

Semantics for Luma Mapping

The syntax element lmcs_min_bin_idx specifies the minimum bin index used in the luma mapping with chroma scaling (LMCS) construction process. The value of lmcs_min_bin_idx shall be in the range of 0 to 15, inclusive.

The syntax element lmcs_delta_max_bin_idx specifies the delta value between 15 and the maximum bin index LmcsMaxBinIdx used in the luma mapping with chroma scaling construction process. The value of lmcs_delta_max_bin_idx shall be in the range of 0 to 15, inclusive. The value of LmcsMaxBinIdx is set equal to 15−lmcs_delta_max_bin_idx. The value of LmcsMaxBinIdx shall be greater than or equal to lmcs_min_bin_idx.

The syntax element lmcs_delta_cw_prec_minus1 plus 1 specifies the number of bits used for the representation of the syntax lmcs_delta_abs_cw[i].

The syntax element lmcs_delta_abs_cw[i] specifies the absolute delta codeword value for the $i_{th}$ bin.

The syntax element lmcs_delta_sign_cw_flag[i] specifies the sign of the variable lmcsDeltaCW[i]. When lmcs_delta_sign_cw_flag[i] is not present, it is inferred to be equal to 0.

LMCS Intermediate Variables Computation for Luma Mapping

In order to apply the forward and inverse Luma mapping processes, some intermediate variables and data arrays are needed.

First of all, the variable OrgCW is derived as follows:

OrgCW=(1<<BitDepth)/16

Then, the variable lmcsDeltaCW[i], with i=lmcs_min_bin_idx . . . LmcsMaxBinIdx, is computed as follows:

lmcsDeltaCW[i]=(1−2*lmcs_delta_sign_cw_flag[i])
*lmcs_delta_abs_cw[i]

The new variable lmcsCW[i] is derived as follows:
For i=0 . . . lmcs_min_bin_idx−1, lmcsCW[i] is set equal 0.

For i=lmcs_min_bin_idx ... LmcsMaxBinIdx, the following applies:

lmcsCW[$i$]=OrgCW+lmcsDeltaCW[$i$]

The value of lmcsCW[i] shall be in the range of (OrgCW>>3) to (OrgCW<<3−1), inclusive.
For i=LmcsMaxBinIdx+1 ... 15, lmcsCW[i] is set equal 0.
The variable InputPivot[i], with i=0 ... 16, is derived as follows:

InputPivot[$i$]=$i$*OrgCW

The variable LmcsPivot[i] with i=0 ... 16, the variables ScaleCoeff[i] and InvScaleCoeff[i] with i=0 ... 15, are computed as follows:

```
LmcsPivot[ 0 ] = 0;
for( i = 0; i <= 15; i++ ) {
   LmcsPivot[ i + 1 ] = LmcsPivot[ i ] + lmcsCW[ i ]
   ScaleCoeff[ i ] = ( lmcsCW[ i ] * ( 1 << 11 ) + ( 1 <<
( Log2( OrgCW ) − 1 ) ) ) >> ( Log2( OrgCW ) )
   if( lmcsCW[ i ] = = 0 )
      InvScaleCoeff[ i ] = 0
   else
      InvScaleCoeff[ i ] = OrgCW * ( 1 << 11 ) / lmcsCW[ i ]
```

Forward Luma Mapping

As illustrated by FIG. 8 when the LMCS is applied for Luma, the Luma remapped sample called predMapSamples[i][j] is obtained from the prediction sample predSamples[i][j].
The predMapSamples[i][j] is computed as follows:
First of all, an index idxY is computed from the prediction sample predSamples[i][j], at location (i,j)

idxY=predSamples[$i$][$j$]>>Log 2(OrgCW)

Then predMapSamples[i][j] is derived as follows by using the intermediate variables idxY, LmcsPivot[idxY] and InputPivot[idxY] of section 0:

predMapSamples[$i$][$j$]=LmcsPivot[idxY]+(ScaleCoeff[idxY]*(predSamples[$i$][$j$]−InputPivot[idxY])+(1<<10))>>11

Luma Reconstruction Samples

The reconstruction process is obtained from the predicted luma sample predMapSample[i][j] and the residual luma samples resiSamples[i][j].
The reconstructed luma picture sample recSamples [i][j] is simply obtained by adding predMapSample[i][j] to resiSamples[i][j] as follows:

recSamples[$i$][$j$]=Clip1(predMapSamples[$i$][$j$]+resiSamples[$i$][$j$])

In this above relation, the Clip 1 function is a clipping function to make sure that the reconstructed sample is between 0 and 1<<BitDepth−1.
Inverse Luma Mapping When applying the inverse luma mapping according to FIG. 8, the following operations are applied on each sample recSample[i][j] of the current block being processed:
First, an index idxY is computed from the reconstruction sample recSamples[i][j], at location (i,j)

idxY=recSamples[$i$][$j$]>>Log 2(OrgCW)

The inverse mapped luma sample invLumaSample[i][j] is derived as follows based on the:

invLumaSample[$i$][$j$]=InputPivot[idxYInv]+(InvScaleCoeff[idxYInv]*(recSample[$i$][$j$]−LmcsPivot[idxYInv])+(1<<10))>>11

A clipping operation is then done to get the final sample:

finalSample[$i$][$j$]=Clip(invLumaSample[$i$][$j$])

Chroma Scaling
LMCS Semantics for Chroma Scaling

The syntax element lmcs_delta_abs_crs in Table 6 specifies the absolute codeword value of the variable lmcsDeltaCrs. The value of lmcs_delta_abs_crs shall be in the range of 0 and 7, inclusive. When not present, lmcs_delta_abs_crs is inferred to be equal to 0.
The syntax element lmcs_delta_sign_crs_flag specifies the sign of the variable lmcsDeltaCrs. When not present, lmcs_delta_sign_crs_flag is inferred to be equal to 0.
LMCS Intermediate Variable Computation for Chroma Scaling
To apply the Chroma scaling process, some intermediate variables are needed.
The variable lmcsDeltaCrs is derived as follows:

lmcsDeltaCrs=(1−2*lmcs_delta_sign_crs_flag)*lmcs_delta_abs_crs

The variable ChromaScaleCoeff[i], with i=0 ... 15, is derived as follows:

if(lmcsCW[$i$]==0)

ChromaScaleCoeff[$i$]=(1<<11)

else

ChromaScaleCoeff[$i$]=OrgCW*(1<<11)/(lmcsCW[$i$]+lmcsDeltaCrs)

Chroma Scaling Process

In a first step, the variable invAvgLuma is derived in order to compute the average luma value of reconstructed Luma samples around the current corresponding Chroma block. The average Luma is computed from left and top luma block surrounding the corresponding Chroma block
If no sample is available the variable invAvgLuma is set as follows:

invAvgLuma=1<<(BitDepth−1)

Based on the intermediate arrays LmcsPivot[ ] of section 0, the variable idxYInv is then derived as follows:

For (idxYInv=lmcs_min_bin_idx;
    idxYInv<=LmcsMaxBinIdx;idxYInv++){ if(invAvgLuma<LmcsPivot[idxYInv+1])break

}

IdxYInv=Min(idxYInv,15)

The variable varScale is derived as follows:

varScale=ChromaScaleCoeff[idxYInv]

When a transform is applied on the current Chroma block, the reconstructed Chroma picture sample array recSamples is derived as follows recSamples[$i$][$j$]=Clip1(predSamples[$i$][$j$]+Sign(resiSamples[$i$][$j$])*((Abs(resiSamples[$i$][$j$])*varScale+(1<<10))>>11))

If no transform has been applied for the current block, the following applies:

recSamples[$i$][$j$]=Clip1(predSamples[$i$][$j$])

Encoder Consideration

The basic principle of an LMCS encoder is to first assign more codewords to ranges where those dynamic range segments have lower codewords than the average variance. In an alternative formulation of this, the main target of LMCS is to assign fewer codewords to those dynamic range segments that have higher codewords than the average variance. In this way, smooth areas of the picture will be coded with more codewords than average, and vice versa.

All the parameters (see Table 6) of the LMCS tools which are stored in the APS are determined at the encoder side. The LMCS encoder algorithm is based on the evaluation of local luma variance and is optimizing the determination of the LMCS parameters according to the basic principle described above. The optimization is then conducted to get the best PSNR metrics for the final reconstructed samples of a given block.

Embodiments

1. Avoid Subpicture when Only One Slice

In one embodiment, the subpicture is not allowed and/or not signalled when at least one syntax element indicates that the current picture contains only one slice. This can be implemented by adding to the semantics of the subpic_info_present_flag the following sentence:

"When one or more syntax elements specify that the current picture contains only one slice, it is a requirement of bitstream conformance that subpic_info_present_flag shall be equal to 0."

The advantage of this embodiment is that it avoids inconsistency in bitstreams. Indeed, a picture which contains subpictures has several slices. If the picture contains only one slice it is a picture which contains only one subpicture. So, in other words, a subpart of the picture. Moreover, it simplifies the parsing of the slice header for some implementations.

1.1 Avoid Subpicture when PH is SH

In one embodiment, the subpicture is not allowed and/or not signalled when the picture header is transmitted in the slice header. Indeed, when the picture header is in the slice header the current picture contains only one slice. So it is not possible to split the current picture into several subpictures which implies several slices as a subpicture contains at least one slice.

1.1.1 Semantics Only

In one embodiment, the subpic_info_present_flag is set equal to 0 when the picture header is transmitted in the slice header. This can be obtained by adding to the semantics of the subpic_info_present_flag the following sentence:

"When slice headers referring to the PPS contain the PH syntax structure, it is a requirement of bitstream conformance that subpic_info_present_flag shall be equal to 0."

1.1.2 Table Syntax

In one embodiment, the slice_subpic_id is not decoded when the picture header is in the slice header as depicted in Table 12. In this syntax table, the slice_subpic_id is decoded only when the subpic_info_present_flag is set equal to 1 and the picture_header_in_slice_header_flag is set equal to 0.

1.2 Avoid Subpicture when Tiles in Slice is Equal to Tiles in Pic and the Number of Tiles in Picture is Greater than 1

In one embodiment, the subpicture is not allowed and/or not signalled when the raster-scan slice mode is enabled, the number of tiles in the current picture is superior to 1 and when the number of tiles in the slice is equal to the number of tiles in the current picture. In that case it is certain that the current picture contains only one slice so the current picture can't contain several subpictures.

1.2.1 Semantics Only

In one embodiment, the subpic_info_present_flag is set equal to 0 when the raster-scan slice mode is enabled, the number of tiles in the current picture is greater than 1 and when the number of tiles in the slice is equal to the number of tiles in the current picture. This can be obtained by adding to the semantics of the subpic_info_present_flag the following sentence:

"When the raster-scan slice mode is enabled, and the number of tiles in the current picture is greater than 1 and when the number of tiles in the slice is equal to the number of tiles in the current picture, it is a requirement of bitstream conformance that subpic_info_present_flag shall be equal to 0."

1.2.2 Table Syntax

In one embodiment, the slice_subpic_id is not decoded when the raster-scan slice mode is enabled, the number of tiles in the current picture is superior to 1 and when the number of tiles in the slice is equal to the number of tiles in the current picture as depicted in Table 13.

1.3—Combination of 1.1+1.2

In one embodiment, the subpicture is not allowed and/or signalled when the picture header is transmitted in the slice header or when the raster-scan slice mode is enabled, the number of tiles in the current picture is superior to 1 and when the number of tiles in the slice is equal to the number of tiles in the current picture.

2 Avoid Separate Colour Planes when Only One Slice

In one embodiment, the colour planes of the current picture are not separated when the current picture contains only one slice. This can be obtained by adding to the semantics of the separate_colour_plane_flag the following sentence:

"When one or more syntax elements specify that the current picture contains only one slice, it is a requirement of bitstream conformance that separate_colour_plane_flag shall not be equal to 1."

The advantage of this embodiment is that it avoids inconsistence bitstreams. Indeed, a picture which contains the colour plane coded independently has several slices. So it is not possible to have only one slice in the current picture. Moreover, it simplifies the parsing of the slice header for some implementations.

2.1 Avoid Separate Colour Planes when PH is SH

In one embodiment, the colour planes of the current picture are not separated when the picture header is transmitted in the slice header. Indeed, when the picture header is in the slice header the current picture contains only one slice.

2.1.1 Semantics Only

In one embodiment, the separate_colour_plane_flag is set equal to 0 when the picture header is transmitted in the slice header. This can be obtained by adding to the semantics of the separate_colour_plane_flag the following sentence:

"When slice headers referring to the PPS contain the PH syntax structure, it is a requirement of bitstream conformance that separate_colour_plane_flag shall be equal to 0."

2.1.2 Table Syntax

In one embodiment, the colour_plane_id is not decoded when the picture header is in the slice header as depicted in Table 12. In this syntax table, the colour_plane_id is decoded only when the separate_colour_plane_flag is set equal to 1 and the picture_header_in_slice_header_flag is set equal to 0.

2.2 Avoid Separate Colour Planes when Tiles in Slice is Equal to Tiles in Pic and the Number of Tiles in Picture is Greater than 1

In one embodiment, the colour planes of the current picture are not separated when the raster-scan slice mode is enabled, the number of tiles in the current picture is greater than 1 and when the number of tiles in the slice is equal to the number of tiles in the current picture. In that case it is sure that the current picture contains only one slice so the current picture can't contain colour planes coded in different slices.

2.2.1 Semantics Only

In one embodiment, the separate_colour_plane_flag is set equal to 0 when the raster-scan slice mode is enabled, the number of tiles in the current picture is greater than 1 and when the number of tiles in the slice is equal to the number of tiles in the current picture. This can be obtained by adding to the semantics of the separate_colour_plane_flag the following sentence:

"When the raster-scan slice mode is enabled, and the number of tiles in the current picture is greater than 1 and when the number of tiles in the slice is equal to the number of tiles in the current picture, it is a requirement of bitstream conformance that separate_colour_plane_flag the shall be equal to 0."

2.2.2 Table Syntax

In one embodiment, the colour_plane_id is not decoded when the raster-scan slice mode is enabled, the number of tiles in the current picture is superior to 1 and when the number of tiles in the slice is equal to the number of tiles in the current picture as depicted in Table 13.

2.3 Combination of 2.1+2.2

In one embodiment, the colour planes of the current picture are not separated when the picture header is transmitted in the slice header or when the raster-scan slice mode is enabled, the number of tiles in the current picture is greater than 1 and when the number of tiles in the slice is equal to the number of tiles in the current picture.

TABLE 12

Partial Slice header showing modifications

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag && | |
|   !picture_header_in_slice_header_flag ) | |
|     slice_subpic_id | u(v) |
|   ... | |
|   if( ( separate_colour_plane_flag = = 1 ) && | |
|   !picture_header_in_slice_header_flag ) | |
|     colour_plane_id | u(2) |
| ... | |

TABLE 13

Partial Slice header showing modifications

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag && (! | |
|   (!rect_slice_flag && NumTilesInPic > 1 && | |

TABLE 13-continued

Partial Slice header showing modifications

| | Descriptor |
|---|---|
|   num_tiles_in_slice_minus1 == NumTilesInPic−1)))) | |
|     slice_subpic_id | u(v) |
|   ... | |
|   if( ( separate_colour_plane_flag = = 1 ) && (! | |
|   (!rect_slice_flag && NumTilesInPic > 1 | |
|   && num_tiles_in_slice_minus1 == NumTilesInPic−1)))) | |
|     colour_plane_id | u(2) |
| ... | |

3. Combination of 1 and 2

In one embodiment, the subpicture is not allowed and/or signalled and the colour planes of the current picture are not separated when at least one syntax element indicates that the current picture contains only one slice.

4. Separate Colour Plane with Only Colour Plane.

In one embodiment, the separated colour planes syntax element is set equal to 1 and the current picture contains one or more slices with only the same colour_plane_id.

This embodiment offers the possibility to extract easily only one colour plane from a bitstream containing the 3 colour planes without modification of some syntax elements to each slice. So, it saves complexity for such applications

4.1 Separate Colour Plane with Only One Slice Set Equal to Luma

In one embodiment, the monochrome of Luma component can be signalled thanks to the separated colour planes syntax element when at least one syntax element indicates that the current picture contains only one slice. In that case the colour_plane_id is inferred to be equal to 0. The advantage of this embodiment compared to the previous one is a bit rate reduction because the colour_plane_id doesn't need to be transmitted.

This can be obtained by adding to the semantics of the colour_plane_id the following sentence:

"When one or more syntax elements specify that the current picture contains only one slice, and when separate_colour_plane_flag is set equal to 1 the colour_plane_id is inferred to be equal to 0."

4.1.1 when PH is SH

In one embodiment, the monochrome of Luma component can be signalled thanks to the separated colour planes syntax element when the picture header is transmitted in the slice header. In that case the colour_plane_id is inferred to be equal to 0. The advantage of this embodiment compared to the previous one is a bit rate reduction because the colour plane id doesn't need to be transmitted.

This can be obtained by adding to the semantics of the colour_plane_id the following sentence:

"When slice headers referring to the PPS contain the PH syntax structure, and when separate_colour_plane_flag is set equal to 1 the colour_plane_id is inferred to be equal to 0." Moreover, the colour_plane_id doesn't need to be transmitted as shown in Table 12.

4.1.2 when Tiles in Slice is Equal to Tiles in Pic and the Number of Tiles in Picture is Greater than 1

In one embodiment, the monochrome of Luma component can be signalled thanks to the separated colour planes syntax element when the raster-scan slice mode is enabled, the number of tiles in the current picture is superior to 1 and when the number of tiles in the slice is equal to the number of tiles in the current picture. In that case the colour_plane_id is inferred to be equal to 0. The advantage of this embodiment is a bit rate reduction because the color plane id doesn't need to be transmitted.

This can be obtained by adding to the semantics of the colour_plane_id the following sentence:

"When the raster-scan slice mode is enabled, and the number of tiles in the current picture is superior to 1 and when the number of tiles in the slice is equal to the number of tiles in the current picture, and when separate_colour_plane_flag is set equal to 1 the colour_plane_id is inferred to be equal to 0."

4.1.3 Combination of 4.1.1 and 0.4.1.2

In one embodiment, the monochrome of Luma component can be signalled thanks to the separated colour planes syntax element when the picture header is transmitted in the slice header or when the raster-scan slice mode is enabled, the number of tiles in the current picture is superior to 1 and when the number of tiles in the slice is equal to the number of tiles in the current picture.

Implementations

Figure 11:
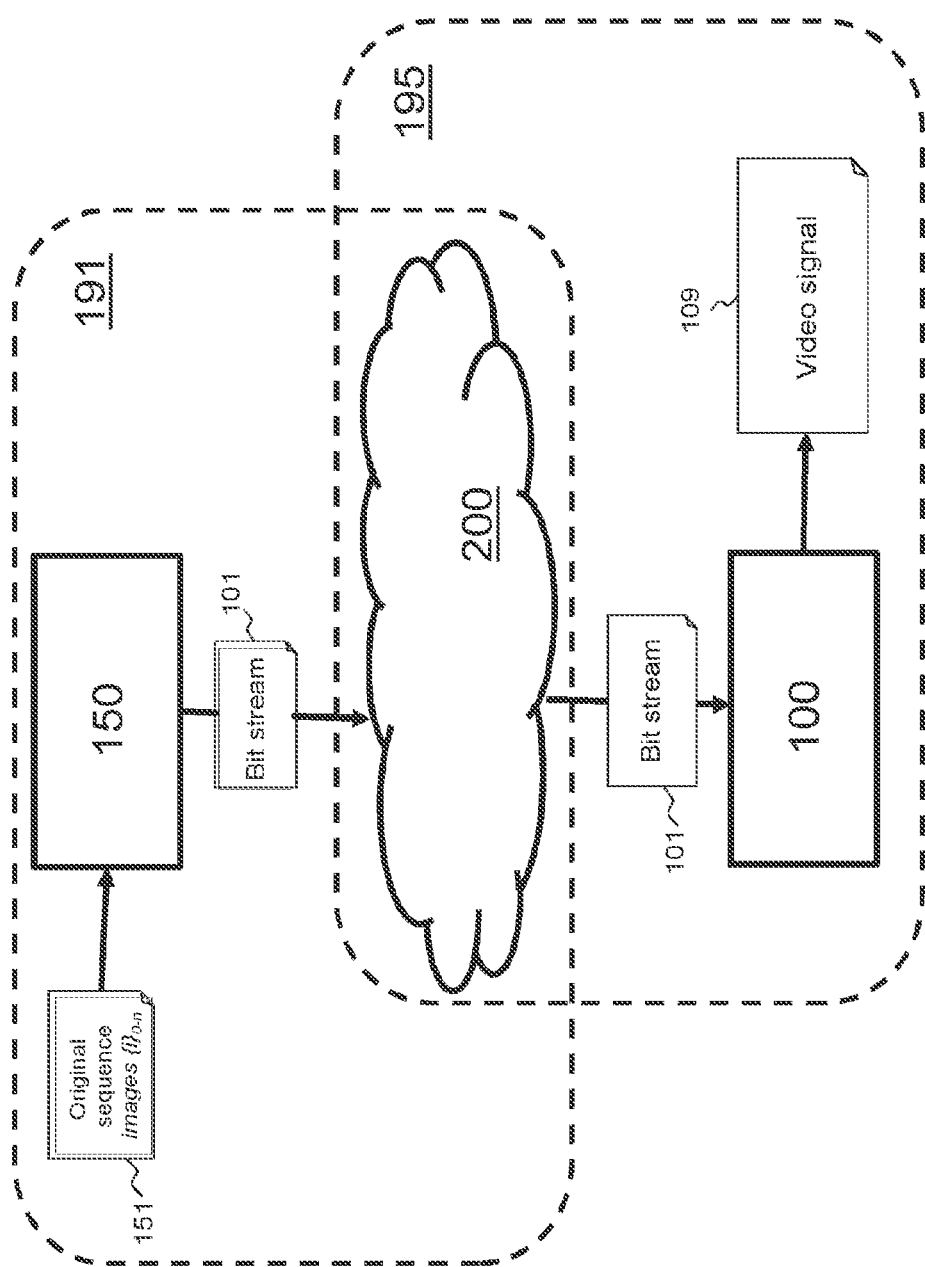
FIG. 11 is a diagram showing a system comprising an encoder or a decoder and a communication network according to embodiments of the present invention.

FIG. 11 shows a system 191, 195 comprising at least one of an encoder 150 or a decoder 100 and a communication network 199 according to embodiments of the present invention. According to an embodiment, the system 195 is for processing and providing a content (for example, a video and audio content for displaying/outputting or streaming video/audio content) to a user, who has access to the decoder 100, for example through a user interface of a user terminal comprising the decoder 100 or a user terminal that is communicable with the decoder 100. Such a user terminal may be a computer, a mobile phone, a tablet or any other type of a device capable of providing/displaying the (provided/streamed) content to the user. The system 195 obtains/receives a bitstream 101 (in the form of a continuous stream or a signal—e.g. while earlier video/audio are being displayed/output) via the communication network 199. According to an embodiment, the system 191 is for processing a content and storing the processed content, for example a video and audio content processed for displaying/outputting/streaming at a later time. The system 191 obtains/receives a content comprising an original sequence of images 151, which is received and processed (including filtering with a deblocking filter according to the present invention) by the encoder 150, and the encoder 150 generates a bitstream 101 that is to be communicated to the decoder 100 via a communication network 191. The bitstream 101 is then communicated to the decoder 100 in a number of ways, for example it may be generated in advance by the encoder 150 and stored as data in a storage apparatus in the communication network 199 (e.g. on a server or a cloud storage) until a user requests the content (i.e. the bitstream data) from the storage apparatus, at which point the data is communicated/streamed to the decoder 100 from the storage apparatus. The system 191 may also comprise a content providing apparatus for providing/streaming, to the user (e.g. by communicating data for a user interface to be displayed on a user terminal), content information for the content stored in the storage apparatus (e.g. the title of the content and other meta/storage location data for identifying, selecting and requesting the content), and for receiving and processing a user request for a content so that the requested content can be delivered/streamed from the storage apparatus to the user terminal. Alternatively, the encoder 150 generates the bitstream 101 and communicates/streams it directly to the decoder 100 as and when the user requests the content. The decoder 100 then receives the bitstream 101 (or a signal) and performs filtering with a deblocking filter according to the invention to obtain/generate a video signal 109 and/or audio signal, which is then used by a user terminal to provide the requested content to the user.

Any step of the method/process according to the invention or functions described herein may be implemented in hardware, software, firmware, or any combination thereof. If implemented in software, the steps/functions may be stored on or transmitted over, as one or more instructions or code or program, or a computer-readable medium, and executed by one or more hardware-based processing unit such as a programmable computing machine, which may be a PC ("Personal Computer"), a DSP ("Digital Signal Processor"), a circuit, a circuitry, a processor and a memory, a general purpose microprocessor or a central processing unit, a microcontroller, an ASIC ("Application-Specific Integrated Circuit"), a field programmable logic arrays (FPGAs), or other equivalent integrated or discrete logic circuitry. Accordingly, the term "processor" as used herein may refer to any of the foregoing structure or any other structure suitable for implementation of the techniques describe herein.

Embodiments of the present invention can also be realized by wide variety of devices or apparatuses, including a wireless handset, an integrated circuit (IC) or a set of JCs (e.g. a chip set). Various components, modules, or units are described herein to illustrate functional aspects of devices/apparatuses configured to perform those embodiments, but do not necessarily require realization by different hardware units. Rather, various modules/units may be combined in a codec hardware unit or provided by a collection of interoperative hardware units, including one or more processors in conjunction with suitable software/firmware.

Embodiments of the present invention can be realized by a computer of a system or apparatus that reads out and executes computer executable instructions (e.g., one or more programs) recorded on a storage medium to perform the modules/units/functions of one or more of the above-described embodiments and/or that includes one or more processing unit or circuits for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more processing unit or circuits to perform the functions of one or more of the above-described embodiments. The computer may include a network of separate computers or separate processing units to read out and execute the computer executable instructions. The computer executable instructions may be provided to the computer, for example, from a computer-readable medium such as a communication medium via a network or a tangible storage medium. The communication medium may be a signal/bitstream/carrier wave. The tangible storage medium is a "non-transitory computer-readable storage medium" which may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. At least some of the steps/functions may also be implemented in hardware by a machine or a dedicated component, such as an FPGA ("Field-Programmable Gate Array") or an ASIC ("Application-Specific Integrated Circuit").

Figure 12:
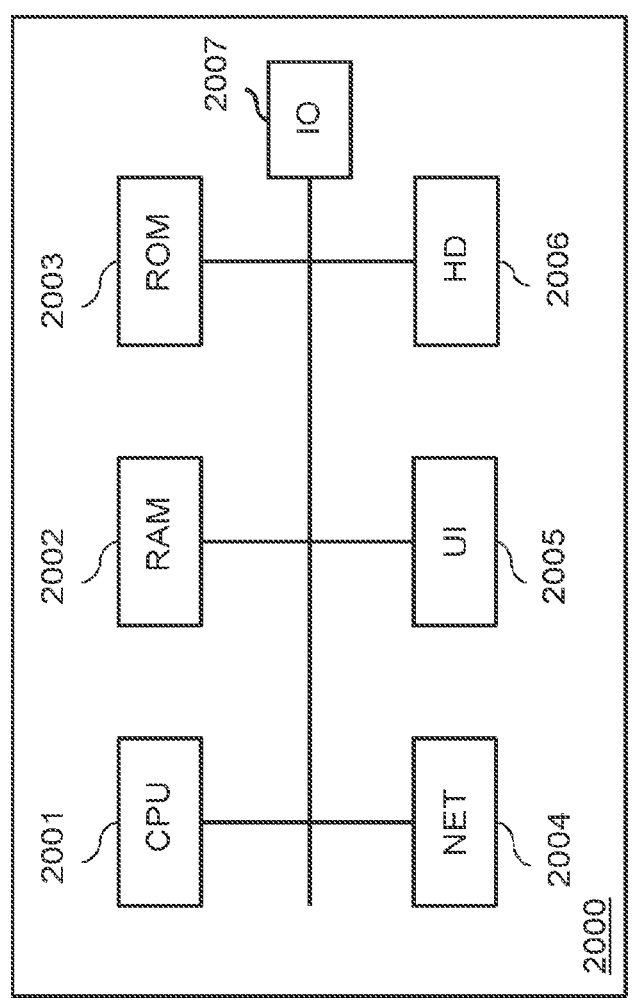
FIG. 12 is a schematic block diagram of a computing device for implementation of one or more embodiments of the invention.

FIG. 12 is a schematic block diagram of a computing device 2000 for implementation of one or more embodiments of the invention. The computing device 2000 may be a device such as a micro-computer, a workstation or a light portable device. The computing device 2000 comprises a communication bus connected to: —a central processing unit (CPU) 2001, such as a microprocessor; —a random access memory (RAM) 2002 for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example; —a read only memory (ROM) 2003 for storing computer programs for implementing embodiments of the invention; —a network interface (NET) 2004 is typically connected to a communication network over which digital data to be processed are transmitted or received. The network interface (NET) 2004 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 2001; —a user interface (UI) 2005 may be used for receiving inputs from a user or to display information to a user; —a hard disk (HD) 2006 may be provided as a mass storage device; —an Input/Output module (IO) 2007 may be used for receiving/sending data from/to external devices such as a video source or display. The executable code may be stored either in the ROM 2003, on the HD 2006 or on a removable digital medium such as, for example a disk. According to a variant, the executable code of the programs can be received by means of a communication network, via the NET 2004, in order to be stored in one of the storage means of the communication device 2000, such as the HD 2006, before being executed. The CPU 2001 is adapted to control and direct the execution of the instructions or portions of software code of the program or programs according to embodiments of the invention, which instructions are stored in one of the aforementioned storage means. After powering on, the CPU 2001 is capable of executing instructions from main RAM memory 2002 relating to a software application after those instructions have been loaded from the program ROM 2003 or the HD 2006, for example. Such a software application, when executed by the CPU 2001, causes the steps of the method according to the invention to be performed.

It is also understood that according to another embodiment of the present invention, a decoder according to an aforementioned embodiment is provided in a user terminal such as a computer, a mobile phone (a cellular phone), a table or any other type of a device (e.g. a display apparatus) capable of providing/displaying a content to a user. According to yet another embodiment, an encoder according to an aforementioned embodiment is provided in an image capturing apparatus which also comprises a camera, a video camera or a network camera (e.g. a closed-circuit television or video surveillance camera) which captures and provides the content for the encoder to encode. Two such examples are provided below with reference to FIGS. 11 and 12.

Network Camera

Figure 13:
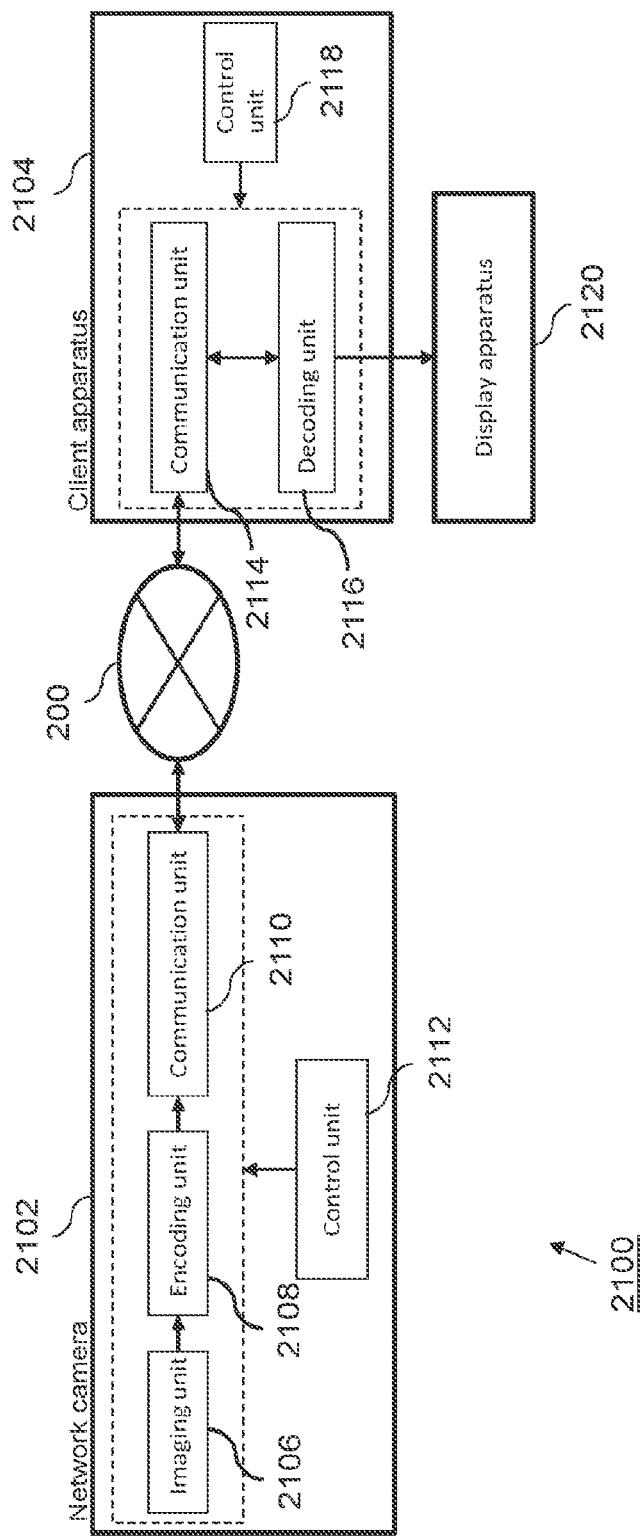
FIG. 13 is a diagram illustrating a network camera system.

FIG. 13 is a diagram illustrating a network camera system 2100 including a network camera 2102 and a client apparatus 2104.

The network camera 2102 includes an imaging unit 2106, an encoding unit 2108, a communication unit 2110, and a control unit 2112.

The network camera 2102 and the client apparatus 2104 are mutually connected to be able to communicate with each other via the network 200.

The imaging unit 2106 includes a lens and an image sensor (e.g., a charge coupled device (CCD) or a complementary metal oxide semiconductor (CMOS)), and captures an image of an object and generates image data based on the image. This image can be a still image or a video image.

The encoding unit 2108 encodes the image data by using said encoding methods described above The communication unit 2110 of the network camera 2102 transmits the encoded image data encoded by the encoding unit 2108 to the client apparatus 2104.

Further, the communication unit 2110 receives commands from client apparatus 2104. The commands include commands to set parameters for the encoding of the encoding unit 2108.

The control unit 2112 controls other units in the network camera 2102 in accordance with the commands received by the communication unit 2110.

The client apparatus 2104 includes a communication unit 2114, a decoding unit 2116, and a control unit 2118.

The communication unit 2114 of the client apparatus 2104 transmits the commands to the network camera 2102.

Further, the communication unit 2114 of the client apparatus 2104 receives the encoded image data from the network camera 2102.

The decoding unit 2116 decodes the encoded image data by using said decoding methods described above.

The control unit 2118 of the client apparatus 2104 controls other units in the client apparatus 2104 in accordance with the user operation or commands received by the communication unit 2114.

The control unit 2118 of the client apparatus 2104 controls a display apparatus 2120 so as to display an image decoded by the decoding unit 2116.

The control unit 2118 of the client apparatus 2104 also controls a display apparatus 2120 so as to display GUI (Graphical User Interface) to designate values of the parameters for the network camera 2102 includes the parameters for the encoding of the encoding unit 2108.

The control unit 2118 of the client apparatus 2104 also controls other units in the client apparatus 2104 in accordance with user operation input to the GUI displayed by the display apparatus 2120.

The control unit 2119 of the client apparatus 2104 controls the communication unit 2114 of the client apparatus 2104 so as to transmit the commands to the network camera 2102 which designate values of the parameters for the network camera 2102, in accordance with the user operation input to the GUI displayed by the display apparatus 2120.

Smart Phone

Figure 14:
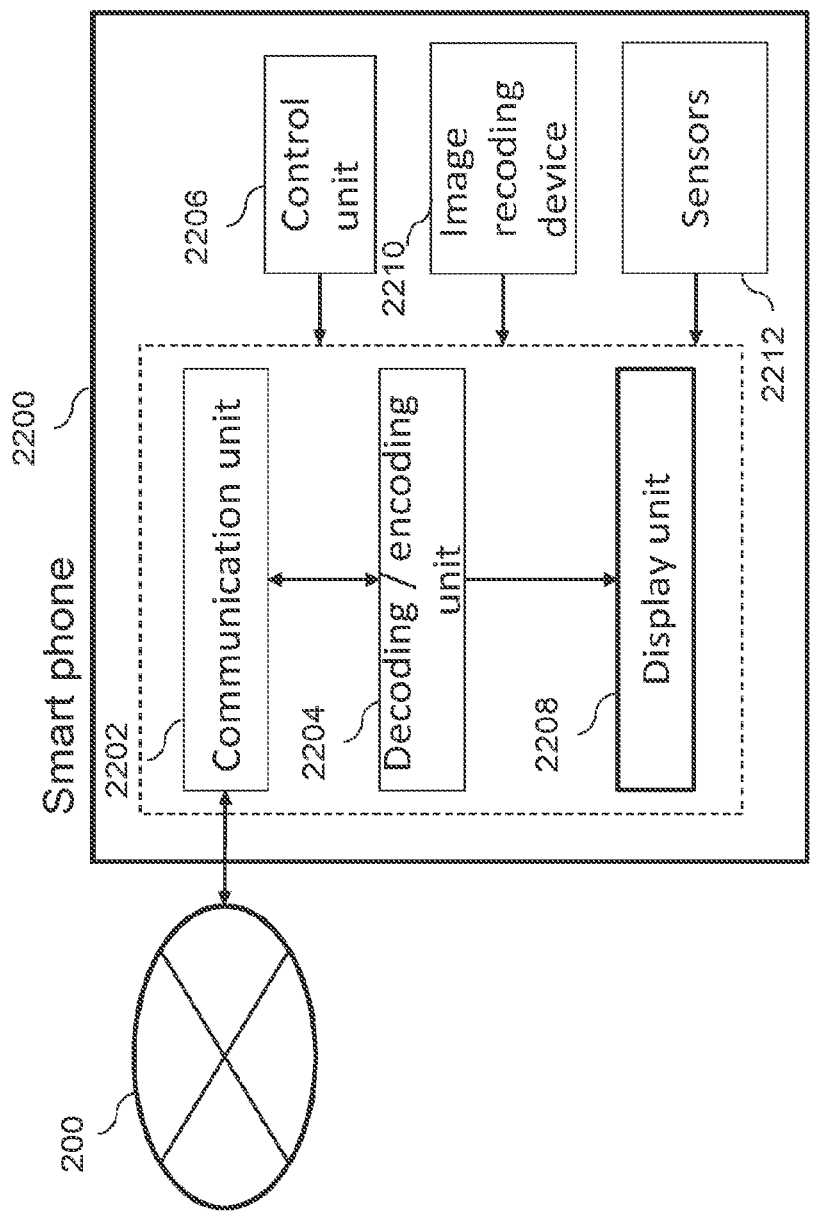
FIG. 14 is a diagram illustrating a smart phone.

FIG. 14 is a diagram illustrating a smart phone 2200.

The smart phone 2200 includes a communication unit 2202, a decoding unit 2204, a control unit 2206, display unit 2208, an image recording device 2210 and sensors 2212.

the communication unit 2202 receives the encoded image data via network 200.

The decoding unit 2204 decodes the encoded image data received by the communication unit 2202.

The decoding unit 2204 decodes the encoded image data by using said decoding methods described above.

The control unit 2206 controls other units in the smart phone 2200 in accordance with a user operation or commands received by the communication unit 2202.

For example, the control unit 2206 controls a display unit 2208 so as to display an image decoded by the decoding unit 2204.

While the present invention has been described with reference to embodiments, it is to be understood that the invention is not limited to the disclosed embodiments. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bitstream, for example a flag or data indicative of the result, so that the indicated or determined/inferred result can be used in the processing instead of actually performing the comparison, determination, assessment, selection, execution, performing, or consideration, for example during a decoding process.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

Reference numerals appearing in the claims are by way of illustration only and shall have no limiting effect on the scope of the claims.

The invention claimed is:

1. A method of decoding video data from a bitstream, the bitstream comprising encoded video data corresponding to one or more slices in a picture, a picture header, and a slice header, the method comprising:
   parsing syntax elements;
   decoding the video data from said bitstream using said syntax elements; and
   wherein subpicture information is not decoded from the bitstream when a first flag decoded from the slice header indicates that the picture header is present in the slice header,
   wherein when (a) a syntax element indicates that a raster scan slice mode is enabled, (b) a number of tiles in the picture is greater than one, and (c) a number of tiles in a slice is equal to the number of tiles in the picture, the picture to be decoded contains only one slice, and
   wherein in a case where weighted prediction parameters and adaptation parameter set (APS) ID for adaptive loop filter (ALF) are decoded from the picture header, the adaptation parameter set (APS) ID for adaptive loop filter (ALF) is decoded from the picture header before the weighted prediction parameters are decoded from the picture header.

2. The method according to claim 1, wherein a second flag indicating whether the subpicture information is present is constrained to have a value indicating that the subpicture information is not present when the first flag indicates that the picture header is present in the slice header.

3. The method according to claim 1, wherein the picture header being present in the slice header is indicative of the picture containing one slice.

4. The method according to claim 1, wherein the subpicture information is a subpicture ID which can be present in the slice header.

5. The method according to claim 1,
   wherein the subpicture information can be present for a CLVS (Coded Layer Video Sequence), and the subpicture information is not decoded for the CLVS when the first flag decoded from the slice header indicates that the picture header is present in the slice header, and
   wherein the first flag indicates whether the picture header is present in the slice header, and a value of the first flag shall be the same in all coded slices in the CLVS.

6. The method according to claim 1, wherein the picture header comprises parameters for a set of slices of one coded picture, and the slice header comprises parameters for a slice.

7. A method of encoding video data into a bitstream, the bitstream comprising encoded video data corresponding to one or more slices in a picture, a picture header, and a slice header, the method comprising:
   encoding one or more syntax elements into a bitstream,
   wherein subpicture information is not encoded into the bitstream when a first flag indicates that the picture header is present in the slice header,
   wherein when (a) a syntax element indicates that a raster scan slice mode is enabled, (b) a number of tiles in the picture is greater than one, and (c) a number of tiles in a slice is equal to the number of tiles in the picture, a picture to be encoded contains only one slice,
   wherein in a case where weighted prediction parameters and adaptation parameter set (APS) ID for adaptive loop filter (ALF) are encoded into the picture header, the adaptation parameter set (APS) ID for adaptive loop filter (ALF) is encoded into the picture header before the weighted prediction parameters are encoded into the picture header; and
   encoding a slice into said bitstream.

8. The method according to claim 7, wherein a second flag indicating whether the subpicture information is present is constrained to have a value indicating that the subpicture information is not present when the first flag indicates that the picture header is present in the slice header.

9. The method according to claim 7, wherein the picture header being present in the slice header is indicative of the picture containing one slice.

10. The method according to claim 7, wherein the subpicture information is a subpicture ID which can be present in the slice header.

11. The method according to claim 7,
   wherein the subpicture information can be present for a CLVS (Coded Layer Video Sequence), and the subpicture information is not encoded for the CLVS when the first flag indicates that the picture header is present in the slice header, and wherein the first flag indicates whether the picture header is present in the slice header, and a value of the first flag shall be the same in all coded slices in the CLVS.

12. The method according to claim 7, wherein the picture header comprises parameters for a set of slices of one coded picture, and the slice header comprises parameters for a slice.

13. A method of decoding video data from a bitstream, the method comprising:
decoding the video data from said bitstream using syntax elements,
wherein the bitstream comprises encoded video data corresponding to one or more slices in a picture, a picture header, and a slice header, said bitstream being constrained so that, i) subpicture information is not decoded from the bitstream when a first flag decoded from the slice header indicates that the picture header is present in the slice header, ii) in a case where the bitstream includes (a) a syntax element that indicates that a raster scan slice mode is enabled, (b) a number of tiles in the picture is greater than one, and (c) a number of tiles in a slice is equal to the number of tiles in the picture, a picture to be decoded contains only one slice, and iii) in a case where weighted prediction parameters and adaptation parameter set (APS) ID for adaptive loop filter (ALF) are decoded from the picture header, the adaptation parameter set (APS) ID for adaptive loop filter (ALF) is decoded from the picture header before the weighted prediction parameters are decoded from the picture header.

14. A method of encoding video data into a bitstream, the method comprising:
encoding a slice into said bitstream,
wherein the bitstream comprises encoded video data corresponding to one or more slices in a picture, a picture header, and a slice header, said bitstream being constrained so that, i) subpicture information is not encoded into the bitstream when a first flag encoded into the slice header indicates that the picture header is present in the slice header, ii) in a case where the bitstream includes (a) a syntax element that indicates that a raster scan slice mode is enabled, (b) a number of tiles in the picture is greater than one, and (c) a number of tiles in a slice is equal to the number of tiles in the picture, a picture to be decoded contains only one slice, and iii) in a case where weighted prediction parameters and adaptation parameter set (APS) ID for adaptive loop filter (ALF) are encoded into the picture header, the adaptation parameter set (APS) ID for adaptive loop filter (ALF) are encoded into the picture header, the adaptation parameter set (APS) ID for adaptive loop filter (ALF) is encoded into the picture header before the weighted prediction parameters are encoded into the picture header.

15. A device comprising a decoder configured to decode video data from a bitstream, the bitstream comprising encoded video data corresponding to one or more slices in a picture, a picture header, and a slice header, the device comprising:
at least one processor; and
at least one memory in communication with the at least one processor and having stored thereon instruction which, when executed by the at least one processor, cause the device to:
parse syntax elements;
decode the video data from said bitstream using said syntax elements,
wherein subpicture information is not decoded from the bitstream when a first flag decoded from the slice header indicates that the picture header is present in the slice header; and
wherein when (a) a syntax element indicates that a raster scan slice mode is enabled, (b) a number of tiles in the picture is greater than one, and (c) a number of tiles in a slice is equal to the number of tiles in the picture, the picture to be decoded contains only one slice, and
wherein in a case where weighted prediction parameters and adaptation parameter set (APS) ID for adaptive loop filter (ALF) are decoded from the picture header, the adaptation parameter set (APS) ID for adaptive loop filter (ALF) is decoded from the picture header before the weighted prediction parameters are decoded from the picture header.

16. A device comprising an encoder configured to encode video data into a bitstream, the bitstream comprising encoded video data corresponding to one or more slices in a picture, a picture header, and a slice header, the device comprising:
at least one processor; and
at least one memory in communication with the at least one processor and having stored thereon instruction which, when executed by the at least one processor, cause the device to:
encode one or more syntax elements into a bitstream,
wherein subpicture information is not encoded into the bitstream when a first flag indicates that the picture header is present in the slice header,
wherein when (a) a syntax element indicates that a raster scan slice mode is enabled, (b) a number of tiles in the picture is greater than one, and (c) a number of tiles in a slice is equal to the number of tiles in the picture, a picture to be encoded contains only one slice, and
wherein in a case where weighted prediction parameters and adaptation parameter set (APS) ID for adaptive loop filter (ALF) are encoded into the picture header, the adaptation parameter set (APS) ID for adaptive loop filter (ALF) is encoded into the picture header before the weighted prediction parameters are encoded into the picture header; and
encoding a slice into said bitstream.

17. A non-transitory computer-readable storage medium storing a program which upon execution executes a method of decoding video data from a bitstream, the bitstream comprising encoded video data corresponding to one or more slices in a picture, a picture header, and a slice header, the method comprising:
parsing syntax elements,
decoding the video data from said bitstream using said syntax elements,
wherein subpicture information is not decoded from the bitstream when a first flag decoded from the slice header indicates that the picture header is present in the slice header; and
wherein when (a) a syntax element indicates that a raster scan slice mode is enabled, (b) a number of tiles in the picture is greater than one, and (c) a number of tiles in a slice is equal to the number of tiles in the picture, the picture to be decoded contains only one slice, and
wherein in a case where weighted prediction parameters and adaptation parameter set (APS) ID for adaptive loop filter (ALF) are decoded from the picture header, the adaptation parameter set (APS) ID for adaptive loop filter (ALF) is decoded from the picture header before the weighted prediction parameters are decoded from the picture header.

* * * * *